(12) United States Patent
Kawamoto et al.

(10) Patent No.: US 8,349,221 B2
(45) Date of Patent: Jan. 8, 2013

(54) METHOD OF PRODUCING PRUSSIAN BLUE-TYPE METAL COMPLEX NANOPARTICLES, AND PRUSSIAN BLUE-TYPE METAL COMPLEX NANOPARTICLES OBTAINED BY THE METHOD, DISPERSION OF THE NANOPARTICLES, METHOD OF REGULATING THE COLOR OF THE NANOPARTICLES, AND ELECTRODE AND TRANSMITTED LIGHT-REGULATOR EACH USING THE NANOPARTICLES

(75) Inventors: Tohru Kawamoto, Tsukuba (JP); Hisashi Tanaka, Tsukuba (JP); Shigeo Hara, Tsukuba (JP); Masato Kurihara, Yamagata (JP); Masatomi Sakamoto, Yamagata (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 407 days.

(21) Appl. No.: 12/521,520

(22) PCT Filed: Dec. 28, 2007

(86) PCT No.: PCT/JP2007/075265
§ 371 (c)(1),
(2), (4) Date: Nov. 24, 2009

(87) PCT Pub. No.: WO2008/081923
PCT Pub. Date: Jul. 10, 2008

(65) Prior Publication Data
US 2010/0133487 A1    Jun. 3, 2010

(30) Foreign Application Priority Data

Dec. 28, 2006 (JP) ................................. 2006-355513
Sep. 18, 2007 (JP) ................................. 2007-241576

(51) Int. Cl.
*C07F 15/02* (2006.01)
(52) U.S. Cl. .................... 252/521.2; 252/581.1; 556/28; 556/136; 556/138
(58) Field of Classification Search .................. 252/521, 252/521.2, 518.1; 556/28, 136, 138
See application file for complete search history.

(56) References Cited

U.S. PATENT DOCUMENTS

| 4,498,739 | A  | * | 2/1985 | Itaya et al. .................... 359/273 |
| 7,678,188 | B2 | * | 3/2010 | Kawamoto et al. ........... 106/458 |
| 2009/0211494 | A1 | * | 8/2009 | Kawamoto et al. ........... 106/460 |
| 2011/0006272 | A1 | * | 1/2011 | Tieke et al. .................... 252/583 |

FOREIGN PATENT DOCUMENTS

| JP | 7-270831 A | 10/1995 |
| JP | 2005-3679 A | 1/2005 |
| JP | 2006-83054 A | 3/2006 |
| JP | 2006-256954 A | 9/2006 |

OTHER PUBLICATIONS

Akihito Goto, "Pd Hihuku Fukugo Kinzoku Sankabutsu Nano Biryushi no Sakuseiho no Kaihatsu", Heisei 15 Nendo Department of Material and Biological Chemistry, Faculty of Science, Yamagata University Sotsugyo Kenkyu Happyokai Koen Yoshishu, Feb. 16, 2004.

Mami Yamada et al., "Synthesis and Isolation of Cobalt Hexacyanoferrate/Chromate Metal Coordination Nanopolymers, Stabilized by Alkylamino Ligand with Metal Elemental Control", J. Am. Chem. Soc. 2004, vol. 126, pp. 9482-9483.

Dean M. DeLongchamp et al., "Multiple-Color Electrochromism from Layer-by-Layer-Assembled Polyaniline/Prussian Blue Nanocomposite Thin Films", Chem. Mater. 2004, vol. 16, pp. 4799-4805.

* cited by examiner

*Primary Examiner* — Marke Eashoo
*Assistant Examiner* — M. Reza Asdjodi
(74) *Attorney, Agent, or Firm* — Birch, Stewart, Kolasch & Birch, LLP

(57) ABSTRACT

A method of producing Prussian blue metal complex nanoparticles and Prussian blue metal complex nanoparticles obtained by the method, a dispersion of the nanoparticles, a method of regulating the color of the nanoparticles, and an electrode and a transmitted light-regulator each using the nanoparticles. Prussian blue metal complex nanoparticles are produced by: mixing an aqueous solution containing a metal cyano complex anion having metal atom $M_A$ as a central metal and an aqueous solution containing a cation of metal atom $M_B$; thereby precipitating the crystal of a Prussian blue metal complex having the metal atom $M_A$ and the metal atom $M_B$; and then mixing the Prussian blue metal complex with an aqueous solution containing a metal cyano complex anion having the metal atom $M_C$ as a central metal and/or an aqueous solution containing a cation of the metal atom $M_D$.

13 Claims, 22 Drawing Sheets

100μm

METHOD OF PRODUCING PRUSSIAN BLUE-TYPE METAL COMPLEX NANOPARTICLES, AND PRUSSIAN BLUE-TYPE METAL COMPLEX NANOPARTICLES OBTAINED BY THE METHOD, DISPERSION OF THE NANOPARTICLES, METHOD OF REGULATING THE COLOR OF THE NANOPARTICLES, AND ELECTRODE AND TRANSMITTED LIGHT-REGULATOR EACH USING THE NANOPARTICLES

FIELD OF THE INVENTION

The present invention relates to a method of producing Prussian blue-type metal complex nanoparticles, and more specifically, to a method of producing Prussian blue-type metal complex nanoparticles obtained by regulating the dispersion property of the fine particles, and Prussian blue-type metal complex nanoparticles obtained by the method, a dispersion of the nanoparticles, a method of regulating the color of the nanoparticles, and an electrode and a transmitted light-regulator each using the nanoparticles.

BACKGROUND ART

Metal-complexes consisting of the particular metals and particular coordination molecules show various properties depending on the combination of the kind of metals and the kind of the coordination molecules. These materials have a wide range of applications, for example, drugs, luminescent materials, coating medium, etc. On the other hand, ultrafine particles are not merely made fine from bulk solids, but they often drive a novel character that never appears in the bulk. Such an appearance of the novel characters has extensively been studied and used. For example, semiconductor or metal fine particles show various properties depending on their particle sizes. A stained glass owes its multiple colors to metal ultrafine particles. In addition, the fine particles of a magnetic oxide such as ferrite have been already put into practical use in, for example, DNA analysis. However, synthesizing ultrafine particles of the metal complexes have been started only in this decade.

Among the metal-complexes, Prussian blue and its analogues (Prussian blue-type metal complex), have extensively been studied. Prussian blue has used as a blue pigment from the past. Furthermore, it has been studied as a potential material for applications of displays and biosensors. FIG. 35 shows the crystal structure of the Prussian blue-type metal complex. The structure is relatively simple, and is such that two kinds of metal atoms (metal atoms 221 ($M_A$) and metal atoms 224 ($M_B$) in FIG. 35) assembling NaCl-type lattices are three-dimensionally crosslinked with cyano groups (carbon atoms 222 and nitrogen atoms 223). As the metallic atoms, various elements such as vanadium (V), chromium (Cr), molybdenum (Mo), tungsten (W), manganese (Mn), iron (Fe), ruthenium (Ru), cobalt (Co), nickel (Ni), platinum (Pt), copper (Cu) can be used. Because various character such as magnetism, electrochemistry, or optical responsiveness by the substitution of the metallic atoms, various kind of materials has been studied (referring to Patent document 1, Patent document 2).

The production of fine particles from the Prussian blue-type metal complex plays an important role in an attempt to put the metal complex into practical use. The production can thus improve the dispersibility of the metal complex in a solvent. As the dispersibility improves, an inexpensive film formation method such as spin coating can be employed, so a biosensor or the like can be produced at a low cost. In addition, the metal complex can be processed by employing any one of the various printing methods, so the metal complex can be expected to find applications in, for example, display devices. Such materials as described below have been reported as magnetic materials: a material that expresses its magnetism at room temperature; and a material the magnetism of which can be regulated by an external stimulus such as irradiation with light or the application of a pressure. The materials are assumed to find use in a wide variety of applications when the materials are turned into nanoparticles. Investigations have been conducted on the application of the magnetic nanoparticles of oxides to memory devices and biomaterials, and the Prussian blue-type metal complex is also assumed to find use in the same applications.

There have been a few reports of the method to produce ultrafine particles of Prussian blue-type metal complex. In these reports, as the materials for stabilizing ultrafine-particles, a surface active agent such as a di-2-ethylhexylsulfosuccinate sodium salt (AOT), a polymer as poly(vinylpyrrolidone (PVP), or a protein such as ferritin (referring to Non-patent document 1) were employed, a molecular having a relatively low molecular weight such as oleylamine (Patent document 3). However, most of those stabilizing molecules each involve the utilization of an organic solvent such as toluene as a solvent. In contrast, water is often a suitable solvent in actual applications. This is because of the following reason: attention must be paid to an influence of the organic solvent on a human body and the handling of the organic solvent, so a special apparatus may be needed. When water can be used as a solvent, such problems can be solved, and the solvent can be handled even in, for example, an environment like an ordinary house. The following example has been reported (Patent document 3): a water-soluble aminoethanol is utilized as a protecting molecule in order that the metal complex may be dispersed in water. However, the water-soluble aminoethanol may be difficult to handle owing to its basicity, and the Prussian blue-type metal complex hydrolyzes, with the result that the yield in which the metal complex is produced reduces in some cases.

In addition, the following example has been reported (Non-patent document): Prussian blue is produced by adding an excessive amount of part of synthesis precursors. However, this example does not qualify for large-scale synthesis because the yield of Prussian blue product is low, and it becomes too much trouble to perform a process for purifying Prussian blue. In addition, only the particles each having the following characteristic are obtained: the internal structure of the particle is entirely uniform. Accordingly, the resultant particles can find use only in a narrow range of applications. In addition, a production method called a layer-by-layer method has been adopted in the production of a thin film from Prussian blue to be applied to a device, so steps for the production become complicated. Further, in the case of this method, a homogeneous film cannot be produced because the method involves alternately laminating the Prussian blue particles and another material.

[Patent document 1] JP-A-2005-3679 gazette
[Patent document 2] JP-A-7-270831 gazette
[Patent document 3] JP-A-2006-256954 gazette
[Non-patent document 1] M. Yamada et al.: J. Am. Chem. Soc., Vol. 126, 2004, p 9482.
[Non-patent document 2] D. M. Delongchamp et al. Chem. Mater., Vol. 16, 2004, p 4799

SUMMARY OF THE INVENTION

Problems that the Invention is to Solve

The present invention addresses a method of producing Prussian blue-type metal complex nanoparticles, without necessarily requiring complicated steps and an excessive amount of raw materials, but allowing one to obtain nanometer-size fine particles having desired fine particle properties, and Prussian blue-type metal complex nanoparticles obtained by the method, a dispersion of the nanoparticles, a method of regulating color of the nanoparticles, and an electrode and a transmitted light-regulator each using the nanoparticles. Further, the present invention addresses a method of producing Prussian blue-type metal complex nanoparticles that are dispersible in various solvents, especially in water or a hydrophilic solvent. Furthermore, the present invention addresses a method of producing Prussian blue-type metal complex nanoparticles having controlled their color thereof with desired electrochemical responsiveness.

Moreover, the present invention addresses a method of producing Prussian blue-type metal complex nanoparticles having a core-shell structure as required so that fine particle properties can be precisely regulated, and Prussian blue-type metal complex nanoparticles obtained by the method, a dispersion of the nanoparticles, a method of regulating the color of the nanoparticles, and an electrode and a transmitted light-regulator each using the nanoparticles.

Means to Solve the Problems

The above objects are achieved by the following means:

(1) A method of producing Prussian blue-type metal complex nanoparticles, comprising, mixing a crystal of a Prussian blue-type metal complex having the following metal atom $M_A$ and the following metal atom $M_B$ of being crosslinked via a cyano group CN with an aqueous solution containing a metal cyano complex anion having the following metal atom $M_C$ as a central metal and/or an aqueous solution containing a cation of the following metal atom $M_D$.

[the metal atom $M_A$: at least one metal atom, or two or more metal atoms, selected from the group consisting of vanadium, chromium, molybdenum, tungsten, manganese, iron, ruthenium, cobalt, nickel, platinum, and copper; the metal atom $M_B$: at least one metal atom, or two or more metal atoms, selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium; the metal atom $M_C$: at least one metal atom, or two or more metal atoms, selected from the group consisting of vanadium, chromium, molybdenum, tungsten, manganese, iron, ruthenium, cobalt, nickel, platinum, and copper; and the metal atom $M_D$: at least one metal atom, or two or more metal atoms, selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium.]

(2) The method of producing Prussian blue-type metal complex nanoparticles according to the above item (1), wherein the crystal of a Prussian blue-type metal complex having the metal atom $M_A$ and the metal atom $M_B$ precipitated by mixing an aqueous solution containing a metal cyano complex anion having the following metal atom $M_A$ as a central metal and an aqueous solution containing a cation of the following metal atom $M_B$ is used as the crystal of the Prussian blue-type metal complex having the $M_A$ and the $M_B$ of being crosslinked with the cyano group CN.

(3). The method of producing Prussian blue-type metal complex nanoparticles according to the above item (1) or (2), wherein a particle size adjustor and/or an optical responsiveness adjustor is added upon precipitating the crystal of a Prussian blue-type metal complex having the metal atom $M_A$ and the metal atom $M_B$ by mixing an aqueous solution containing a metal cyano complex anion having the following metal atom $M_A$ as a central metal and an aqueous solution containing a cation of the following metal atom $M_B$, as a preparation process of the crystal of the Prussian blue-type metal complex having the $M_A$ and the $M_B$ of being crosslinked with the cyano group CN.

(4) The method of producing Prussian blue-type metal complex nanoparticles according to any one of the above items (1) to (3), wherein the nanoparticles are obtained as a powder by removing the solvent from the mixed liquid.

(5) Prussian blue-type metal complex nanoparticles having an average particle size of 500 nm or less produced by the production method according to any one of the above items (1) to (4).

(6) A dispersion of Prussian blue-type metal complex nanoparticles, comprising the dispersion containing nanoparticles produced by the method according to any one of the above items (1) to (3), or the nanoparticles of re-dispersing the nanoparticle powder produced by the method according to the above item (4) in a solvent.

(7) Prussian blue-type metal complex nanoparticles, comprising: a crystal of a Prussian blue-type metal complex, and a metal cyano complex anion and/or a metal cation adsorbed on the surface of the crystal.

(8) The Prussian blue-type metal complex nanoparticles according to the above item (7), wherein the complex crystal is substantially insoluble in water, and the surface of each fine particle is negatively or positively charged by the adsorption of the anion and/or the cation so as to make the fine particle soluble or dispersible in water.

(9) The Prussian blue-type metal complex nanoparticles according to the above item (7) or (8), wherein the complex crystal forms a core portion, and the anion and the cation adsorbed on the core portion form a shell portion in combination thereof, so that the shell portion formed in having metal composition different from that of the core portion a Prussian blue-type metal complex structure.

(10) The Prussian blue-type metal complex nanoparticles according to the above item (9), wherein the nanoparticles are each provided with multiple shell portions of being identical to or different from each other in metal composition.

(11) The Prussian blue-type metal complex nanoparticles according to any one of the above items (7) to (10), further comprising: ligands adsorbed on the outer surfaces of the nanoparticles.

(12) The Prussian blue-type metal complex nanoparticles according to the above item (11), wherein the ligand has 4 or more and 100 or less carbon atoms.

(13) The Prussian blue-type metal complex nanoparticles according to the above item (11) or (12), wherein the ligand is represented by any one of formulae (1) to (3):

[Formula 1]

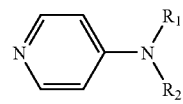

Formula (1)

wherein $R_1$ and $R_2$ each independently represent a hydrogen atom, or, an alkyl group, alkenyl group, or alkynyl group, of having 8 or more carbon atoms;

[Formula 2]

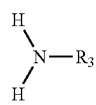

Formula (2)

wherein $R_3$ represents an alkyl group, alkenyl group, or alkynyl group, of having 8 or more carbon atoms;

[Formula 3]

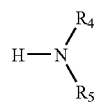

Formula (3)

wherein $R_4$ represents an alkyl group, alkenyl group, or alkynyl group, of having 6 or more carbon atoms; and $R_5$ represents an alkyl group, an alkenyl group, or an alkynyl group.

(14) The Prussian blue-type metal complex nanoparticles according to the above item (13), wherein the substituents $R_1$ to $R_4$ each represent an alkenyl group.

(15) A method of regulating the color of Prussian blue-type metal complex nanoparticles, comprising: providing the nanoparticles each having a core-shell structure according to any one of the above items (9) to (14); and, adjusting the amount of the shell portion.

(16) Prussian blue-type metal complex nanoparticles, wherein the color of the nanoparticles is regulated by the method according to the above item (15);

(17) An electrode, comprising: a substrate; and the Prussian blue-type metal complex nanoparticles according to any one of the above items (5), (7) to (14), and (16) provided on the substrate.

(18) A transmitted light-regulator, comprising the Prussian blue-type metal complex nanoparticles according to any one of the above items (5), (7) to (14), and (16).

[Effect of the Invention]

According to the production method of the present invention, nanometer-size Prussian blue-type metal complex nanoparticles each having a precise structure and desired dispersion property can be obtained without necessarily requiring a complicated step or an excessive amount of a raw material. In addition, Prussian blue-type metal complex nanoparticles having controlled their color and desired electrochemical responsiveness without depending on the addition of a dye or any chemical treatment characteristics can be efficiently obtained, so the method is suitable for large-scale production.

Further, the above Prussian blue-type metal complex nanoparticles are each particularly excellent in safety and handleability when the nanoparticles are turned into water-dispersible fine particles, and are dissolved or dispersed in water.

Moreover, according to the production method of the present invention, bottom-up-type nanoparticles in each of which individual atoms or molecules are stacked can be formed. In addition, via the design of a fine particle structure as required such as the formation of fine particles each having a core-shell structure, for bringing about excellent effect, the physical properties of the nanoparticles in the color and electrochemical responsiveness and the like can be finely regulated.

Figure 1:
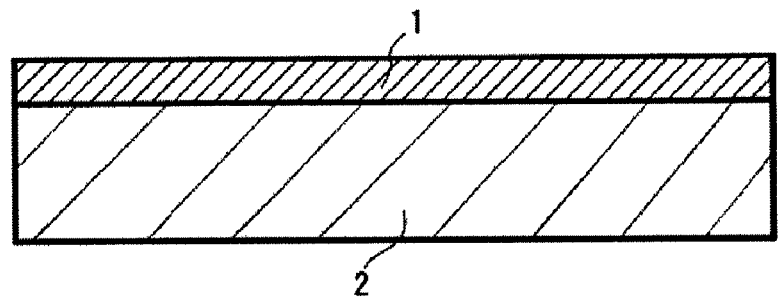
FIG. 1 is a sectional view schematically showing a preferred embodiment of an electrode of the present invention.

| REFERENCE SIGNS LIST | |
|---|---|
| 1 | Layer containing Prussian blue-type metal complex nanoparticles |
| 2 | Conductive substrate |
| 10 | Transmitted light-regulator |
| 10A | Transparent electrode side member |
| 10B | Counter electrode side member |
| 11 | Transparent insulator |
| 12 | Transparent electrode body |
| 13 | Ultra fine particle thin film layer |
| 14 | Electrolyte layer |
| 16 | Counter electrode layer |
| 17 | Counter electrode side insulator |
| 220 | Prussian blue-type metal complex (crystal structure) |
| 221 | Metal atom $M_1$ |

| REFERENCE SIGNS LIST -continued | |
|---|---|
| 222 | Carbon atom |
| 223 | Nitrogen atom |
| 224 | Metal atom $M_2$ |

BEST MODE FOR CARRYING OUT THE INVENTION

Hereinafter, the present invention is described in detail.

In a production method of the present invention, the crystal of a Prussian blue-type metal complex obtained by crosslinking a metal atom $M_A$ and a metal atom $M_B$ with a cyano group CN is formed. A specific production method is as follows: an aqueous solution containing a metal cyano complex anion using the metal atom $M_A$ as a central metal and an aqueous solution containing a cation of the metal atom $M_B$ are mixed so that the crystal of the Prussian blue-type metal complex having the metal atom $M_A$ and the metal atom $M_B$ may be precipitated. Here, the metal atom $M_A$ and the metal atom $M_B$ may be identical to or different from each other.

The metal atom $M_A$ is at least one metal atom, or two or more metal atoms, selected from the group consisting of vanadium, chromium, molybdenum, tungsten, manganese, iron, ruthenium, cobalt, nickel, platinum, and copper. Among those, as the metal atom $M_A$, iron, chromium, or cobalt is more preferable, and iron is particularly preferable. Regarding the metal atom $M_A$, the combination of iron and chromium, the combination of iron and cobalt, the combination of chromium and cobalt are preferable, and the combination of iron and chromium is more preferable. The counter ion with regard to the anionic metal-cyano complex with the atom $M_A$ as the central atom is not limited, and examples thereof include potassium ion, ammonium ion, and sodium ion.

The metal atom $M_B$ is at least one metal atom, or two or more metal atoms, selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium. As the metal atom $M_B$, iron, cobalt, nickel, vanadium, copper, manganese, or zinc is more preferable, and iron, cobalt, or nickel is further preferable. Regarding the metal atom $M_B$, the combination of iron and nickel, the combination of iron and cobalt, the combination of nickel and cobalt are preferable, the combination of iron and nickel is more preferable. The counter ion with regard to the metal atom $M_B$ is not limited, and examples thereof include $Cl^-$, $NO_3^-$, $SO_4^{2-}$, and the like.

The mixing ratio of the metal-cyano complex and the metal cation is not limited, but it is preferred to mix those so that the ratio "$M_A:M_B$" would be 1:1 to 1:1.5, in terms of molar ratio.

In the production method of the present invention, the size of the crystal formed by the above-described process may significantly affect the diameter of nanoparticles of finally obtained. Accordingly, by mixing a diameter-controlling agent which is for controlling the size of the Prussian blue-type metal complex at the time of production, it is possible to control the diameter of the nanoparticles of finally obtained. An exemplified diameter controlling agent includes ammonia.

In the production method of the present invention, Prussian blue-type metal complex nanoparticles are obtained by mixing the Prussian blue-type metal complex obtained as described above with an aqueous solution containing a metal cyano complex anion using the metal atom $M_C$ as a central metal and/or an aqueous solution containing a cation of the metal atom $M_D$. With such procedure, the surface of each fine particle can be charged in a desired fashion.

Here, the nature of general particles will be described. Even in the case where primary particles are nanometer-size particles, when the particles physically aggregate in a solvent so as to be excessively large, the particles are eventually identical to bulk particles, with the result that the particles become insoluble (hardly soluble), or unable to disperse (hard to disperse), in the solvent. (In the present invention, such state is referred to as "substantially insoluble". To be specific, it is preferred that the following state can be maintained for one day or longer. The state is at the concentration of being dissolved or dispersed particles kept in the range of 5 to 100 mass % at room temperature (25° C.). It is more preferred that the following state can be maintained for one day or longer. The state is at the concentration kept in the range of 10 to 100 mass %.) Accordingly, a Prussian blue-type metal complex obtained by a general production method is substantially insoluble in a solvent such as water.

In contrast, according to the production method of the present invention, a Prussian blue-type metal complex having an extremely small size of, for example, about 10 to 200 nm can be obtained. In addition, individual nanoparticles can be made soluble or dispersible in various solvents by bringing each of their crystal surfaces into a predetermined charged state to maintain a state where the nanoparticles are separated from each other. The term "soluble or dispersible" as used in the present invention refers to a state different from the above "substantially insoluble" state. To be specific, it is preferred that the following state can be maintained for one day or longer. The state is at the concentration of being dissolved or dispersed particles kept in the range of 5 to 100 mass % at room temperature (25° C.). It is more preferred that the following state can be maintained for one day or longer. The state is at the concentration kept in the range of 10 to 100 mass %. It should be noted that the above-mentioned surface of each fine particle may be "positively" charged, or may be "negatively" charged.

To be more specific, an electrostatic repulsive interaction is caused to act between the nanoparticles to prevent the aggregation of the nanoparticles in a solvent. As a result, the nanoparticles can be dispersed in the solvent. Water is particularly preferably utilized as the solvent because water molecules each have polarity. When the nanoparticles are turned into fine particles soluble or dispersible in water (water-dispersible fine particles) as described above, the fine particles can be dissolved or dispersed in, for example, an aqueous medium (such as water, a mixed liquid of water and an alcohol, or an aqueous solution of an inorganic salt such as hydrochloric acid or an aqueous solution of sodium hydroxide) or a polar solvent such as an alcohol.

Here, the metal atom $M_C$ is one kind or two or more kinds of metal atoms selected from the group consisting of vanadium, chromium, molybdenum, tungsten, manganese, iron, ruthenium, cobalt, nickel, platinum, and copper. The preferable range thereof and counter ions thereof are the same as those described in the metal atom $M_A$.

The metal atom $M_D$ is one kind or two or more kinds of metal atoms selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium. The preferable range thereof and counter ions thereof are the same as those described in the metal atom $M_B$.

The cyano complex anion of the metal atom $M_A$ or $M_C$ is preferably a hexacyano metal complex anion. In ordinary cases, the hexacyano metal complex anion is of such a shape that a metal atom is surrounded with six cyano groups; part of the cyano groups may be substituted by other molecules, and the number of cyano groups may range from four to eight.

The Prussian blue-type metal complex adopts such a structure that the cation of the metal atom $M_B$ and the hexacyano metal complex anion composed of the central metal $M_A$ are alternately combined. In the following description, the metal cation and hexacyano metal complex anion of which the metal complex is constituted are represented by $B^+$ and $A^-$, respectively. It should be noted that the Prussian blue-type metal complex crystal may have vacancies, and is not requested to be a perfect crystal. In addition, the crystal may be a composite crystal in which multiple different metal cations $B^+$ and multiple different hexacyano metal complex anions $A^+$ are combined. The Prussian blue-type metal complex crystal before surface modification is referred to as "core portion".

An embodiment of the production method of the present invention is, for example, such that the metal atoms $M_A$ and $M_B$ of which the core portion is constituted and metal atoms $M_C$ and $M_D$ to be further added are metal atoms identical to one another.

The embodiment is described by taking the above Prussian blue-type metal complex (core portion) composed of the cation $B^+$ and the anion $A^-$ as an example. In the case where the metal ion $B^+$ is further added to the core portion, the metal ion $B^+$ adsorbs to the surface of the hexacyano metal complex anion $A^-$ of the core portion. As a result, the $A^-$ of the core portion is coated with the $B^+$, and a ratio of the metal cation $B^+$ on the surface of each nanoparticle increases, whereby the surface is "positively" charged. On the other hand, in the case where the hexacyano metal complex anion $A^-$ is added, the hexacyano metal complex anion $A^-$ adsorbs to the metal cation $B^+$ of the core portion, and the cation $B^+$ is coated with the $A^-$, whereby the surface is "negatively" charged. In each case, the nanoparticles eventually become soluble or dispersible in various solvents.

Another embodiment of the production method of the present invention is, for example, such that metals different from the metal atoms $M_A$ and $M_B$ of which the core portion is constituted are selected and used as the metal atoms $M_C$ and $M_D$ to be further added.

To be specific, for example, a metal cation $D^+$ is further added to the Prussian blue-type metal complex composed of the cation $B^+$ and the anion $A^-$ (core portion). As a result, the $A^-$ on the surface of the core portion is coated with the $D^+$, and the $B^+$ or $D^+$ is exposed to the surface, whereby the surface of each fine particle is "positively" charged. Then, the metal composition of the entire fine particle becomes no longer uniform, whereby a nanoparticle having a layer formed of a metal different from those of the core portion on the surface side can be produced. When a hexacyano metal complex anion $C^-$ different from that of the core portion is further added after the production, the $C^-$ is stacked so as to coat the $B^+$ and $D^+$ described above. That is, an outer layer portion composed of the $D^+$ and $C^-$ different from those of the core portion is formed. Thus, a nanoparticle of such a structure as to have the core portion ($A^-$ and $B^+$) and the shell portion ($C^-$ and $D^+$) in the Prussian blue-type metal complex can be produced.

As described above, according to the production method of the present invention, a nanoparticle having a desired layer structure formed by the following procedure can be produced: the predetermined metal cation and hexacyano metal complex anion of which the shell portion is constituted are added in a predetermined order and a predetermined number of times so that atoms or molecules may be stacked. When a fine particle having a multilayer structure is produced by providing multiple shell portions, the respective shell portions may be identical to or different from each other in metal composition.

The produced nanoparticles may not be sufficiently dispersed in a solvent depending on the kind and amount of the metal cation $D^+$ or hexacyano metal complex anion $C^-$ to be added, but the present invention does not exclude such embodiment. That is, in the present invention, even when the nanoparticles are not sufficiently dissolved or dispersed in a predetermined solvent at the time of their production, each of the nanoparticles can be provided with predetermined solubility or dispersibility by adding a predetermined metal cation and a predetermined hexacyano metal complex anion in a predetermined order and a predetermined number of times.

Although the addition amounts of the metal atoms $M_C$ and $M_D$ to be added at one time are not particularly limited, for example, a molar ratio "the total number of moles of the metal atoms $M_A$ and $M_B$":"the number of moles of the metal atom $M_C$ or $M_D$" is set to fall within the range of preferably 1:0.01 to 1:0.5, or more preferably 1:0.05 to 1:0.2. Changing the addition amounts can adjust the amount of the shell portion with which the core portion is coated, thereby enabling the regulation of the color property (color-developing property), electrochemical responsiveness, dispersion property, and the like of each nanoparticle to be obtained. In addition, dispersion selectivity can be imparted to each nanoparticle. In this case, the shell portion is not requested to coat the entire outer surface of the core portion completely, and may be unevenly distributed to part of the outer surface of the core portion. When the state where the shell portion is unevenly distributed and the amount of the shell portion described above are adjusted, a nanoparticle with its color property finely regulated by a combination of the color of the core portion and the color of the shell portion can be obtained.

A combination of the Prussian blue-type metal complex to serve as the core portion and the Prussian blue-type metal complex to serve as the shell portion is not particularly limited as long as both the metal complexes are different from each other in metal composition; in the case of a combination of the $M_A$-$M_B$-type complex (core portion) and the $M_C$-$M_D$-type complex (shell portion), for example, a combination of an Fe—Fe-type complex (core portion) and an Fe—Ni-type complex (shell portion), a combination of an Fe—Ni-type complex (core portion) and an Fe—Fe-type complex (shell portion), or a combination of an Fe—Co-type complex (core portion) and an Fe—Fe-type complex (shell portion) is preferable.

The term "nanoparticles" as used in the present invention refers to particles which are fined to have sizes of the order of $10^{-9}$ m, and which can be dispersed in, and isolated from and re-dispersed in, various solvents in a nanoparticle state, i.e., which are discrete particles (particles that cannot be isolated from a dispersoid or dispersion and particles that cannot be isolated from and re-dispersed in the dispersoid or dispersion are not included in the category of the "nanoparticles"). The nanoparticles have an average particle size of preferably 200 nm or less, or more preferably 50 nm or less.

The term "particle size" as used in the present invention refers to the diameter of a primary particle free of any such protecting ligand as described later unless otherwise stated; the term refers to the circle-equivalent diameter of the particle (value calculated from the image of each ultrafine particle obtained by observation with an electron microscope as the diameter of a circle equivalent to the projected area of the particle). The term "average particle size" refers to the average of the particle sizes of at least 30 ultrafine particles measured as described above unless otherwise stated. Alternatively, the average particle size may be estimated from an average size calculated from the half width of a signal obtained by the powder X-ray diffraction (XRD) measurement of an ultrafine particle powder, or may be estimated from dynamic light scattering measurement; provided that, when the average particle size is measured by the dynamic light scattering measurement. In this regards, attention must be paid to the fact that the resultant particle size may be obtained as that including a protecting ligand.

It should be noted that, in a state where the nanoparticles are dispersed in a solvent, two or more of the nanoparticles collectively behave as a secondary particle, and an additionally large average particle size may be observed depending on a method for the measurement of the average particle size and the environment thereof; when the ultrafine particles in a dispersed state serve as secondary particles, the average particle size of the secondary particles is preferably 200 nm or less. It should be noted that an additionally large aggregate may be formed by, for example, the removal of a protecting ligand as a result of, for example, a treatment after the formation of an ultrafine particle film, and the present invention should not be construed as being limitative owing to the formation of the aggregate.

Another embodiment of the production method of the present invention is, for example, such that an organic ligand L is added to each Prussian blue-type metal complex nanoparticle with its surface charged and modified as described above. In this case, nanoparticles that can be dissolved or dispersed in an organic solvent can be obtained. As the organic ligand, one or two or more compounds having a pyridyl group or an amino group as a binding portion (preferably being a compound having 4 or more and 100 or less carbon atoms). It is more preferable to use one or two or more compound(s) represented by any one of the following formulae (1) to (3).

[Formula 4]

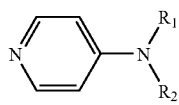

Formula (1)

In formula (1), $R_1$ and $R_2$ each independently represents a hydrogen atom, or an alkyl group, alkenyl group or alkynyl group, each having 8 or more carbon atoms (preferably having 12 to 18 carbon atoms). $R_1$ and $R_2$ are preferably an alkenyl group, in which there is no upper limit on the number of carbon-carbon double bonds therein, it is preferable that the number is 2 or less. When the ligand L having an alkenyl group is used, the dispersibility can be improved even when the compound is hard to disperse in a solvent other than a polar solvent (excluding methanol and acetone from which a ligand may be eliminated, e.g., chloroform). Specifically, using a ligand having an alkenyl group, the resultant compound can favorably disperse in a nonpolar solvent (e.g., hexane), unless the ligand is eliminated. This is the same as in the cases of $R_3$ and $R_4$. Among the compounds represented by formula (1), 4-di-octadecylaminopyridine, 4-octadecylaminopyridine, and the like are preferable.

[Formula 5]

Formula (2)

In formula (2), $R_3$ represents an alkyl group, alkenyl group or alkynyl group, each having 8 or more carbon atoms (preferably having 12 to 18 carbon atoms). $R_3$ is preferably an alkenyl group. Although there is no upper limit on the number of carbon-carbon double bonds, it is preferable that the number is 2 or less. Among the compounds represented by formula (2), oleylamine is preferable as a ligand having an alkenyl group, and stearylamine is preferable as a ligand having an alkyl group.

[Formula 6]

Formula (3)

In formula (3), $R_4$ represents an alkyl group, alkenyl group or alkynyl group, each having 6 or more carbon atoms (preferably having 12 to 18 carbon atoms), and $R_5$ represents an alkyl group, an alkenyl group, or an alkynyl group (each preferably having 1 to 60 carbon atoms). It is preferable that $R_4$ be an alkenyl group. There is no upper limit on the number of carbon-carbon double bonds, and it is preferable that the number be 2 or lower.

Meanwhile, the compounds represented by formula (1), (2), or (3) may have a substituent, unless the effects of this invention are obstructed.

The coordination amount of the ligand L in each Prussian blue-type metal complex nanoparticle is not particularly limited, and, for example, a molar ratio of the ligand to the metal atoms in the nanoparticle (the total amount of the metal atoms $M_A$, $M_B$, $M_C$, and $M_D$) is preferably set to about 5 to 30%, though the preferable value varies depending on the particle size and shape of each ultrafine particle. With such setting, a stable dispersion (ink) containing the nanoparticles of the Prussian blue-type metal complex can be prepared, and an ultrafine particle thin-film layer can be produced by film formation from a liquid with high accuracy. The addition amount of the ligand L at the time of the preparation of the dispersion is preferably as follows: a molar ratio of the ligand to the metal ions in each nanoparticle (the total amount of the metal atoms $M_A$, $M_B$, $M_C$, and $M_D$) is about 1:0.2 to 1:2.

When the Prussian blue-type metal complex nanoparticles are each caused to adsorb the ligand L, the nanoparticles can be turned into fine particles that can be dissolved or dispersed in an organic solvent. Examples of the organic solvent include toluene, dichloromethane, chloroform, hexane, ether, and butyl acetate. That is, the dispersion property of each of the Prussian blue-type metal complex nanoparticles can be switched by using the ligand L. The amount of the Prussian blue-type metal complex nanoparticles, which are made organic solvent-dispersible, to be dissolved or dispersed in the organic solvent is not particularly limited; the amount is preferably 5 to 100 mass %, or more preferably 10 to 100 mass %.

In the production method of the present invention, the Prussian blue-type metal complex nanoparticles are obtained in a state of being dissolved or dispersed in a mixed liquid; a fine particle powder can be obtained by separating the solvent through, for example, removal by distillation under reduced pressure, filtration, or centrifugal separation.

In addition, upon production of the Prussian blue-type metal complex nanoparticles, an additive may be appropriately added, and, in this case, another physical property can be imparted to each nanoparticle. For example, the optical property of a product is preferably regulated depending on whether or not ammonia, pyridine, or a combination of them is added as an optical property adjustor, and the amount of the adjustor. It should be noted that one can refer to the contents described in Japanese Patent Application Laid-open No. 2006-256954 and Japanese Patent Application No. 2006-190958 for a method of precipitating the Prussian blue-type metal complex and the protecting ligand L.

The dispersion of the nanoparticles can be processed by using various kinds of film-forming technologies and printing technologies. As the printing technologies, an inkjet printing method, a screen printing method, a gravure printing method, a relief-printing method, and the like can be used. As the film-forming technologies, a spin coating method, a bar coating method, a squeegee method, Langmuir-Blodgett method, a casting method, a spraying method, a dip coating method, and the like can be used. Alternatively, a method involving the use of a chemical bond between a substrate and each nanoparticle is also permitted. Those methods allow one to utilize the dispersion in the processing of, for example, various devices.

In this case, nanoparticle dispersion is preferably used, and a solvent for the dispersion may be water, methanol, ethylene glycol, or the like, or may be a mixed liquid of them. In addition, another substance such as a resin may be mixed into the dispersion for adjusting various properties of the dispersion such as a viscosity and a surface tension.

An electrode can be obtained by using the Prussian blue-type metal complex nanoparticles of the present invention. For example, when the nanoparticles are utilized in an electrode for an electrochemical device, the upper portion of a conductor is preferably caused to adsorb the nanoparticles by employing any one of the above application techniques. FIG. 1 is a sectional view schematically showing a preferred embodiment of an electrode of the present invention. For example, a flat electrode is obtained by providing a layer 1 composed of the nanoparticles of the present invention on a flat conductor 2. The flat conductor 2 may be composed of one layer or multiple layers, or may be a combination of an insulator and a conductor.

The shape of the electrode of the present invention is preferably, for example, a rectangular shape, a circular shape, or a rod shape, but is not limited to them. The thickness, shape, and the like of the flat conductor 2 are not requested to be identical to those of the nanoparticle layer 1. In addition, the nanoparticle layer 1 may be a mixed film containing the nanoparticles and another material or containing multiple kinds of nanoparticles, or may be a multilayer film for the purpose of, for example, improving the electric conductivity or electrochemical responsiveness.

The color of the electrode of the present invention can be electrochemically regulated. When a transparent conductor is utilized as the conductor 2, the optical transmittance of the electrode can be regulated depending on the color of each nanoparticle, whereby a transmitted light-regulator can be obtained. The transmitted light-regulator of the present invention can be utilized not only in the regulate of transmitted light but also in the regulate of absorbed light or reflected light. In addition, when a conductor having a high reflectance such as a white conductor is utilized as the conductor 2, the reflectance of the electrode itself can be regulated by an effect of the transmitted light-regulator.

Figure 2:
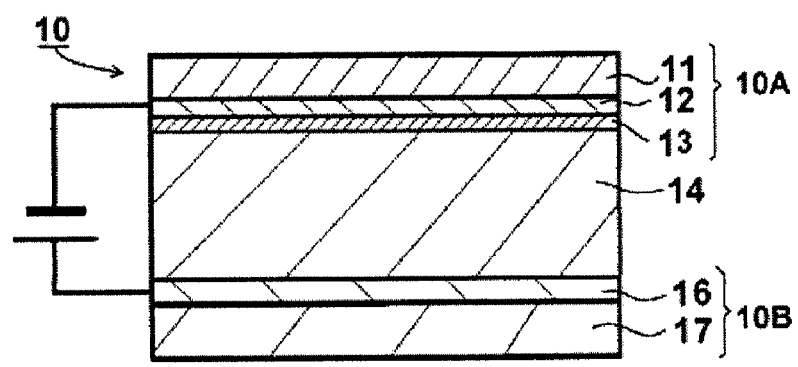
FIG. 2 is a sectional view schematically showing a preferred embodiment of a transmitted light-regulator of the present invention.

FIG. 2 is a sectional view schematically showing a preferred embodiment of the transmitted light-regulator of the present invention; provided that the present invention is not limited to the embodiment. Here, an electrode body 10A for a reversibly color changeable display apparatus is obtained by providing a transparent insulating layer 11 and a transparent conductive layer 12 with a reversibly color changeable thin-film layer 13 formed of a dispersion containing the nanoparticles of the present invention. In addition, the open surface side of the reversibly color changeable thin-film layer 13 is provided with an electrolyte layer 14, and the further out side is provided with a counter conductive structure layer 10B (a counter conductive layer 16 and a counter side insulating layer 17). In addition, a voltage is applied to the apparatus so that the color of the reversibly color changeable thin-film layer 13 may be reversibly regulated to change.

It should be noted that the term "conductive structure layer" in the present invention is used to mean not only a product obtained by providing a conductive layer on one side of the insulating layer of a substrate or the like but also a product free of any insulating layer and having only a conductive layer composed of a conductive material.

Figure 3:
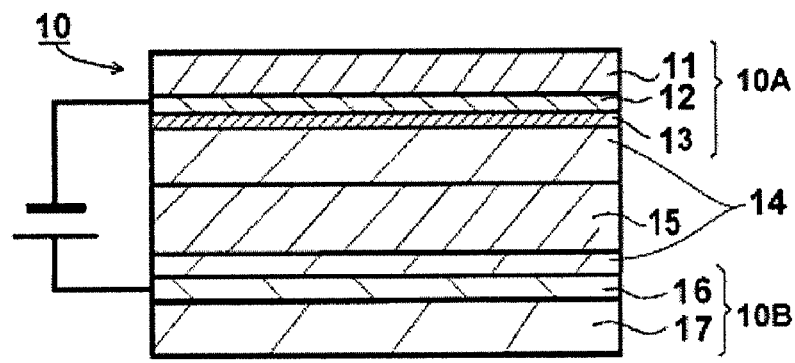
FIG. 3 is a sectional view schematically showing another preferred embodiment of the transmitted light-regulator of the present invention.

Further, as shown in FIG. 3, a light reflection-adjusting layer 15 may be provided in the electrolyte layer 14. The light reflection-adjusting layer is placed for adjusting the optical property of the apparatus. For example, when a layer having a high reflectance and showing a white color is placed, light incident from above the apparatus is reflected, so such layer is convenient for the formation of a reflection-type display apparatus. For example, a layer composed of titanium oxide fine particles is desirably used as the light reflection-adjusting layer.

A material for the transparent insulating layer 11 is not particularly limited as long as the material is transparent and has insulating property; for example, glass, quartz, or a transparent insulating polymer (such as polyethylene terephthalate or polycarbonate) can be utilized.

A material for the transparent conductive layer 12 is not particularly limited as long as the material is transparent and conductive; for example, indium tin oxide (ITO), tin oxide, zinc oxide, cadmium tin oxide, or any other transparent substance showing metallic conductivity can be utilized.

The reversibly color changeable thin-film layer 13 is a thin-film layer formed from a dispersion containing the Prussian blue-type metal complex nanoparticles of the present invention; provided that the layer 13 may be a mixed film containing the nanoparticles and another material or containing multiple kinds of nanoparticles, or may be a multilayer film for the purpose of, for example, improving the electric conductivity or electrochemical responsiveness of the apparatus.

The electrolyte layer 14 has only to satisfy the following conditions: the electrolyte layer is composed of a solid or liquid containing an electrolyte, and the reversibly color changeable thin-film layer 13 is not eluted in the electrolyte layer. To be specific, the electrolyte is preferably, for example, potassium hydrogen phthalate, potassium chloride, $KPF_6$, sodium perchlorate, lithium perchlorate, potassium perchlorate, or tetrabutyl ammonium perchlorate, or particularly preferably potassium hydrogen phthalate, $KPF_6$, or potassium perchlorate. When an electrolyte solution prepared by dissolving the electrolyte in a solvent is used in the electrolyte layer, water, acetonitrile, propylene carbonate, ethylene glycol, or the like is preferably used as the solvent. Alternatively, any one of the various polymer solid electrolytes, superionic conductors, and the like can also be used. An electrochemical-property-regulating agent, color-property-regulating agent, or the like to be described later may be incorporated into the electrolyte layer 4. Alternatively, as shown in FIG. 3, the electrolyte layer 14 may contain a solid for regulating the optical property, electrochemical property, and the like of the apparatus.

Gold, silver, copper, aluminum, ITO, tin oxide, zinc oxide, a conductive polymer, or the like can be used in the counter conductive layer 16.

A material for the counter side insulating layer 17 is not limited as long as the material is a solid material that is not conductive. For example, glass, quartz, an insulating polymer typified by polyethylene terephthalate, ceramic, an oxide, or rubber can be used.

Further, a counter modification layer can be provided between the electrolyte layer 14 and the conductive structure layer 10B as required, and is preferably a layer composed of an electrochemical-property-regulating agent or a color-developing-property regulating agent (such as ferrocene). The counter modification layer can be provided as a layer composed of various materials for improving device properties. Alternatively, a material having electrochromic property such as a Prussian blue-type metal complex nanoparticle can also be used as a substance to be incorporated into the counter modification layer.

In addition, a sealing material can be provided as required, and an insulating material capable of preventing the drain of the electrolyte is preferably used as the sealing material. For example, any one of the various insulating plastics, glass, ceramic, an oxide, or rubber can be used.

The transmitted light-regulator of the present invention can be molded into a shape in accordance with a purpose. In addition, the respective layers of the apparatus are not requested to have the same shape. The size of the apparatus is not particularly limited, and, when the apparatus is used as a device for large-screen display, its area can be set to fall within the range of, for example, 1 to 3 $m^2$; on the other hand, when the apparatus is produced as an ultrafine pixel for color display, the area is preferably set to fall within the range of, for example, $1.0 \times 10^{-10}$ to $1.0 \times 10^{-1}$ $m^2$, or is preferably set to about $1.0 \times 10^{-8}$ $m^2$.

Further, for example, when a figure, letter pattern, or the like having a desired shape is displayed, a color display region may be designed by providing the reversibly color changeable thin-film layer 13 with a desired shape, or may be designed by providing the conductive structure layer 10B (or the conductive layer 12 or 16) below the reversibly color changeable thin-film layer 13 with a desired shape while producing the reversibly color changeable thin-film layer 13 itself so that the reversibly color changeable thin-film layer 13 may cover a broad range. It should be noted that the transmitted light-regulator of the present invention may be as follows: the apparatus can achieve not only the reversibly color changeable display of a figure or letter pattern but also a free change of, for example, the color of a wall surface in a habitable room or shop, or the surface color of a piece of furniture by the change of the coloring of the entire apparatus, and adjusts and regulates the color pattern of the wall surface and/or the color pattern of the piece of furniture.

In addition, when a transparent material is used in the counter conductive structure layer 10B (to be specific, any one of the materials for the transparent conductive film and the transparent insulating layer described above can be used), the apparatus can be a reversibly color changeable dimming apparatus. The use of the apparatus enables, for example, the control of the state of window glass or the like between a colored state and a transparent state.

In addition, an additionally specific application example is as follows: a segment-type display such as a commodity price display in a supermarket can be produced by, for example, combining a large number of transmitted light-regulators. Upon formation of a device including a large number of pixels in, for example, an electronic paper application, a product in which devices each composed of the transmitted light-regulator are arrayed in an array fashion is preferably formed. An ordinary regulate method such as a passive matrix mode or an active matrix mode can be employed in display regulate in this case. In addition, when various patterns are formed by employing a printing technique, and are placed on the surfaces of artifacts such as a piece of furniture, a building, and a car body, the external appearance of an artifact on which a pattern has been placed can be changed by performing regulate as to whether or not the pattern is displayed.

In addition, the color of each of the Prussian blue-type metal complex nanoparticles obtained by the present invention can be regulated by a method except an electrochemical approach. When the transmitted light-regulator is produced by such method, no electrode is needed, and no limitations are imposed on the shape of the apparatus.

The production method of the present invention enables efficient production of Prussian blue-type metal complex nanoparticles dispersible in water. As a result, devices can be easily produced by various printing methods and film formation methods at low costs. A special qualification may be needed for the use of some kinds of organic solvents in large-scale production, or a special apparatus may be needed for securing safety upon handling of some other kinds of organic solvents. In this connection, the production method of the present invention relieves us from such constraints. Moreover, the use of water as a solvent allows one to adopt an additionally wide variety of production modes. For example, the nanoparticles can be utilized in on-demand device production in a general commercial facility or household. Most of ink-jet printers utilized in households each utilize an ink containing water as a solvent, and the nanoparticles can be utilized in the ink as well.

A device that can be achieved by printing is, for example, a pixel (matrix) produced for utilization in a display device. In actuality, a matrix structure has been produced by ink-jet printing in a display device utilizing polymer electroluminescence, and the dispersion of the present invention can be used in the same manner. In particular, the production method of the present invention allows one to produce nanoparticles capable of developing various colors, thereby enabling the realization of, for example, a full-color display device.

In addition, the production method of the present invention allows one to produce nanoparticles each having a core-shell structure. As a result, a wide variety of properties can be imparted to the fine particles, and thereby, e.g., even a subtle difference in optical spectrum shape can be adjusted depending on the needs. The achievement of such coloring material design with a high degree of freedom meets today's sophisticated technical needs in a leading-edge imaging technology field.

In addition, the Prussian blue-type metal complex nanoparticles of the present invention can find use in various applications because of their electrochemical properties. For example, the nanoparticles can be suitably utilized in a color changeable apparatus such as a display apparatus or dimming apparatus because the color of each of the nanoparticles can be electrochemically regulated. In addition, a device utilizing the following nature can also be obtained: the electrochemical properties of the nanoparticles are changed by the addition of specific molecules. In addition, the nanoparticles are expected to find applications in magnetic materials such as a memory material and additives for drugs. In those cases as well, the production method of the present invention allows one to produce nanoparticles each freely provided with dispersion property for a desired solvent (dispersion property such as water-dispersibility or organic solvent-dispersibility). Accordingly, the nanoparticles can find use in an expanded variety of applications, and can be produced on an industrial scale in a wide variety of fields.

EXAMPLE

The present invention will be described in more detail based on examples given below, but the invention is not meant to be limited by these.

Example 1

Synthesis of Prussian Blue Nanoparticles Each Utilizing Ferrocyanide Ion as Coating Agent (A1) An aqueous solution prepared by dissolving 14.5 g of sodium ferrocyanide decahydrate in 60 mL of water was mixed with 30 mL of an aqueous solution prepared by dissolving 16.2 g of iron nitrate nonahydrate in water, and the mixture was stirred for 5 minutes. The deposited Prussian blue precipitate having a blue color was centrifuged, washed with water three times and then with methanol once, and dried under reduced pressure. The amount of the resultant in this case was 11.0 g, and the yield in terms of $Fe_4[Fe(CN)_6]_3 \cdot 15H_2O$ was 97.4%.

Figure 4:
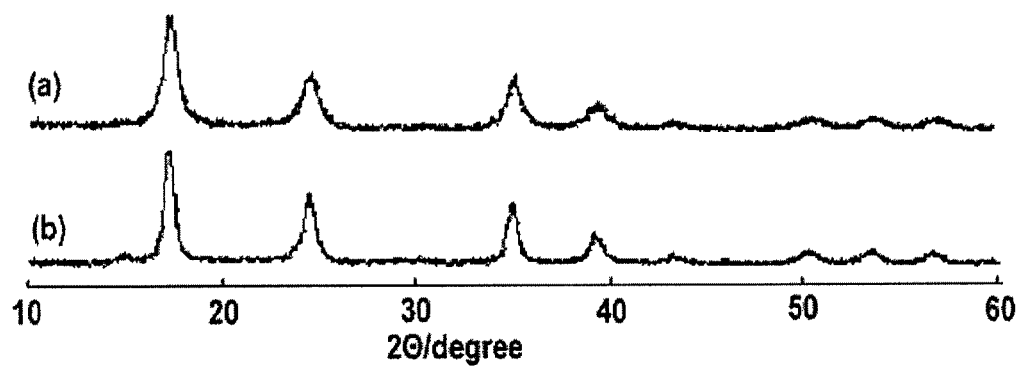
FIG. 4 are X-ray diffraction charts of Prussian blue-type metal complexes, FIG. 4(a) showing a result of a Prussian blue complex and FIG. 4(b) showing a result of $Ni_3[Fe(CN)_6]_2 \cdot xH_2O$ (x=14 to 15).
Figure 5:
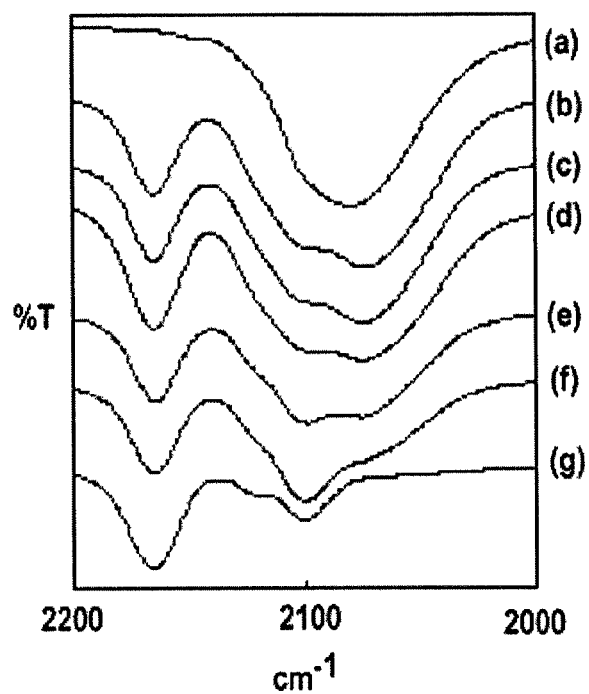
FIG. 5 are the FT-IR spectra of water dispersions of Prussian blue-type metal complexes, FIG. 5(a) showing a result of the Prussian blue complex, FIGS. 5(b) to (f) showing results of Prussian blue-type metal complex nanoparticles each having a core-shell structure of the present invention, and FIG. 5(g) showing a result of $Ni_3[Fe(CN)_6]_2 \cdot xH_2O$ (x=14 to 15).
Figure 6:
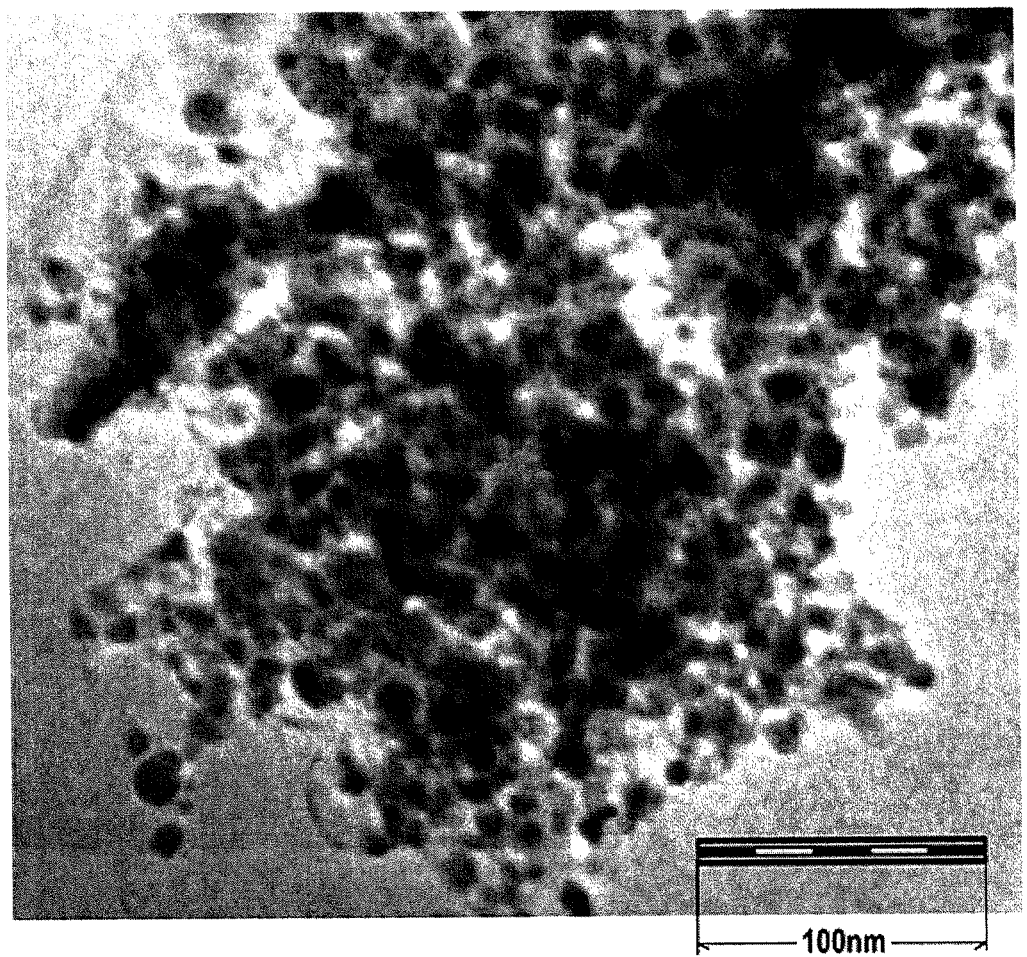
FIG. 6 shows a photograph, substituting for a drawing, of a transmission electron microscope (TEM) image of Prussian blue nanoparticles of this invention.

FIG. 4(a) shows the result of the analysis of the produced Prussian blue complex (precipitate) by powder X-ray diffraction measurement. The result coincided with that of Prussian blue $Fe_4[Fe(CN)_6]_3$ retrieved from a standard sample database. In addition, a peak resulting from an Fe-CN stretching vibration appeared at around 2,080 $cm^{-1}$ in the FT-IR measurement of the solid (FIG. 5(a)), so the solid proved to be Prussian blue. The image of the solid by a transmission electron microscope showed that Prussian blue obtained here was an aggregate of nanoparticles each having a particle size of 10 to 20 nm as shown in FIG. 6.

(B1) 0.40 g of the Prussian blue complex (aggregate) produced in the above section (A1) was suspended in 8 mL of water. 180 mg, or 80 mg, of sodium ferrocyanide decahydrate were added to the suspension, and the mixture was stirred, whereby the mixture changed into a blue, transparent solution. Thus, the nanoparticles of Prussian blue of the present invention (samples 1-1 and 1-4) were obtained.

Figure 7:
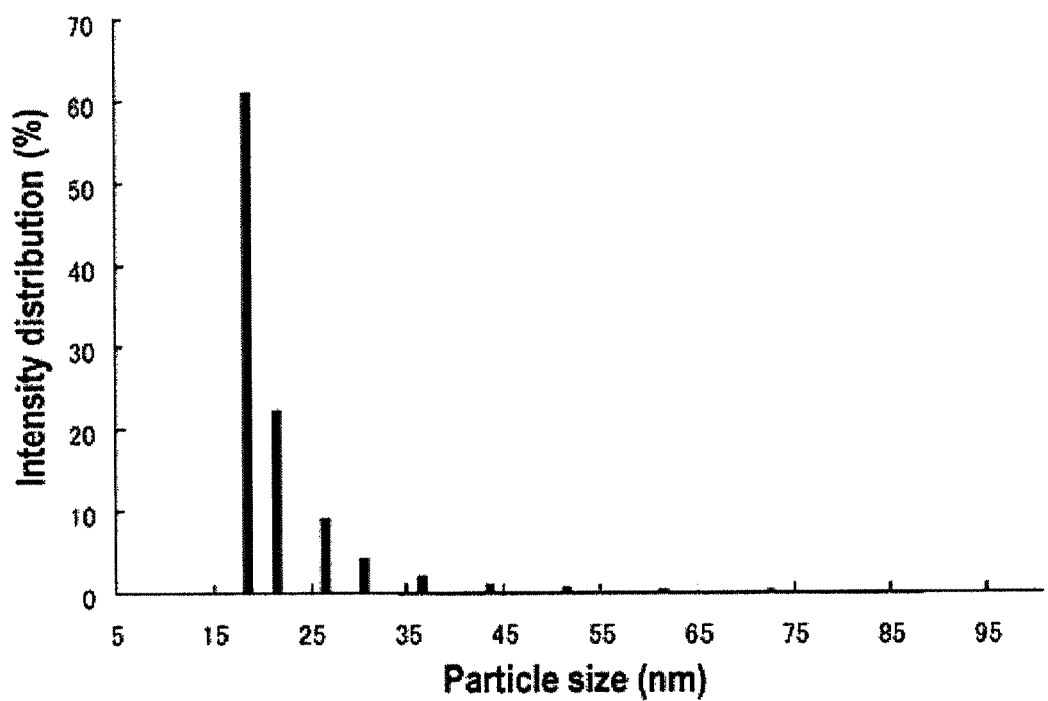
FIG. 7 is a graph showing a particle size distribution of nanoparticles of Prussian blue of the present invention.
Figure 8:
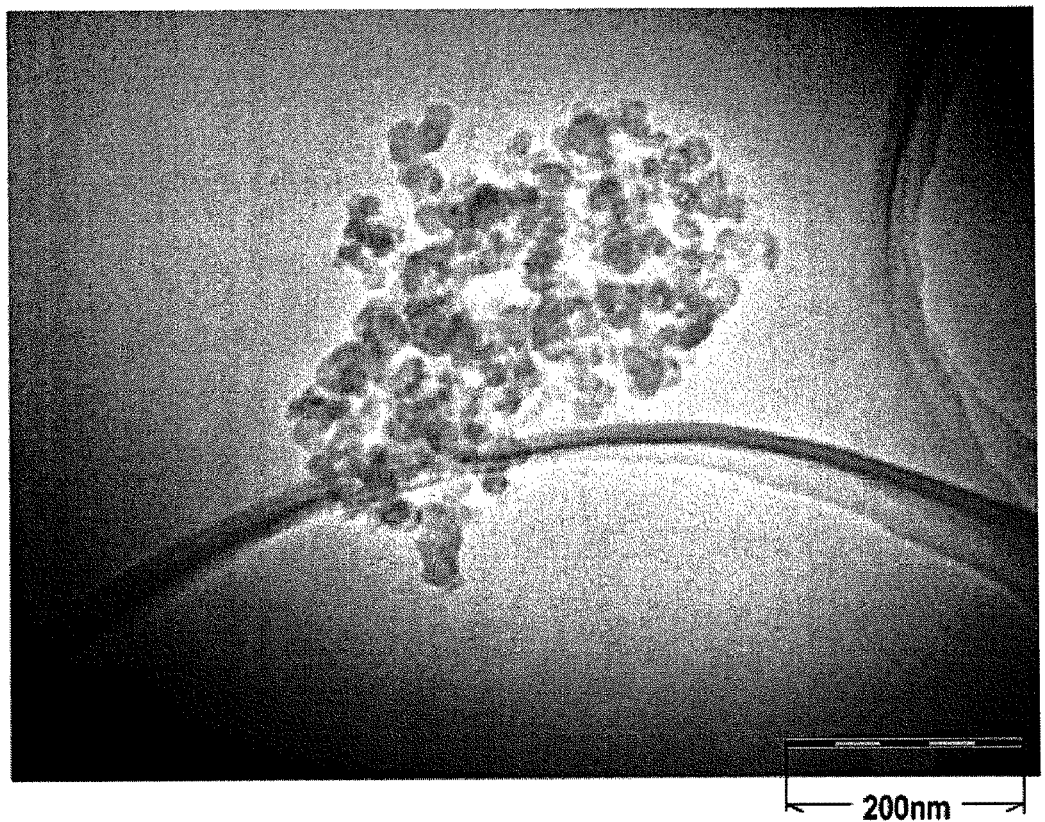
FIG. 8 is a photograph as a substitute for a figure showing a transmission electron microscope image when the nanoparticles of Prussian blue of the present invention are re-dispersed in water.

The particle sizes of the nanoparticles of Prussian blue stably dispersed in the blue, transparent aqueous solution were measured by dynamic light scattering method. As shown in FIG. 7, the result of a number average particle size distribution (the sample 1-2 obtained by the addition of 180 g) showed that the nanoparticles of Prussian blue in water have particle sizes in the range of about 21±6 nm. In addition, the result of an observation with a transmission electron microscope shown in FIG. 8 (the sample 1-4 obtained by the addition of 80 mg) confirmed the presence of particles having similar particle sizes (in the figure, a particulate substance at the center is a nanoparticle, and belt-shaped substances at the center and the right upper portion are each an image of a microgrid substrate for the transmission electron microscope).

(C1) Nanoparticles were produced in the same manner as in the above section (B1) except that the addition amount of sodium ferrocyanide added in the section was changed to 60 mg. Water as a solvent in the water dispersion of the nanoparticles (blue, transparent aqueous solution) was removed by distillation under reduced pressure, whereby a powder of Prussian blue-type metal complex nanoparticles (sample 1-1) as an aggregated solid was obtained in a substantially quantitative fashion. The resultant powder was re-dispersed in water, methanol, or ethylene glycol, whereby a dark blue, transparent solution was prepared.

The fine particle solid powder thus obtained was analyzed with a powder X-ray diffraction apparatus. As a result, the peak position of the powder coincided with the peak position of Prussian blue in the standard sample database (see FIG. 9). The foregoing shows that the structure of Prussian blue is maintained.

Figure 10:
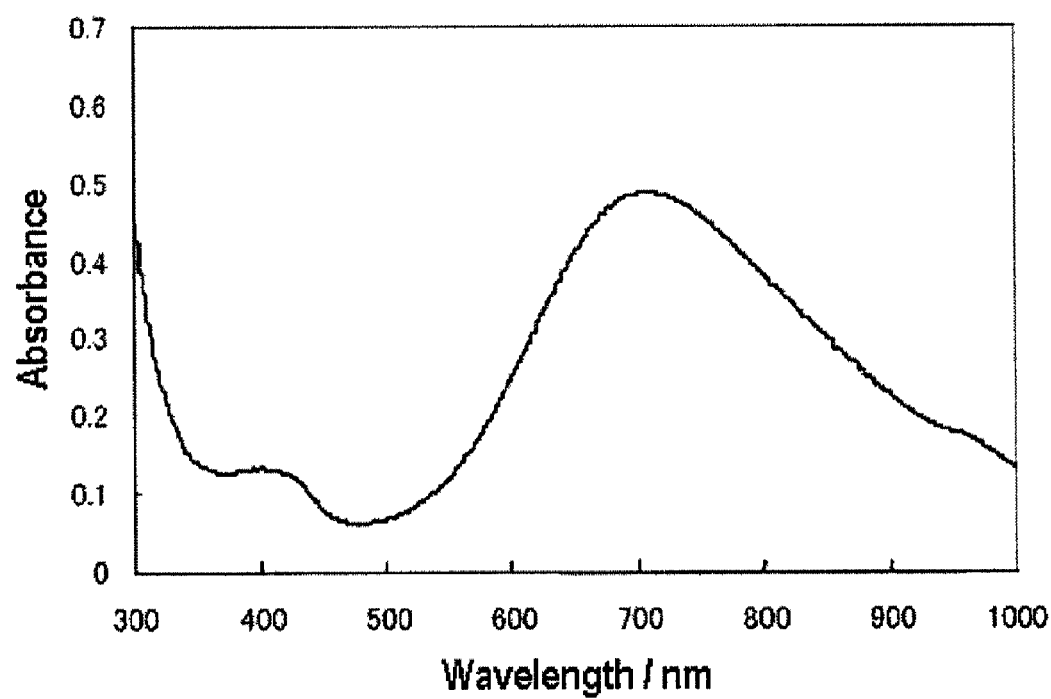
FIG. 10 is an absorption spectrum of a water dispersion of the nanoparticles of Prussian blue of the present invention.

In the absorption spectrum of the blue, transparent aqueous solution in which the above nanoparticles of Prussian blue (sample 1-1) were stably dispersed (FIG. 10), a charge-transfer absorption band from Fe(II) to Fe(III) peculiar to Prussian blue having an absorption maximum at around 700 nm was observed.

Figure 9:
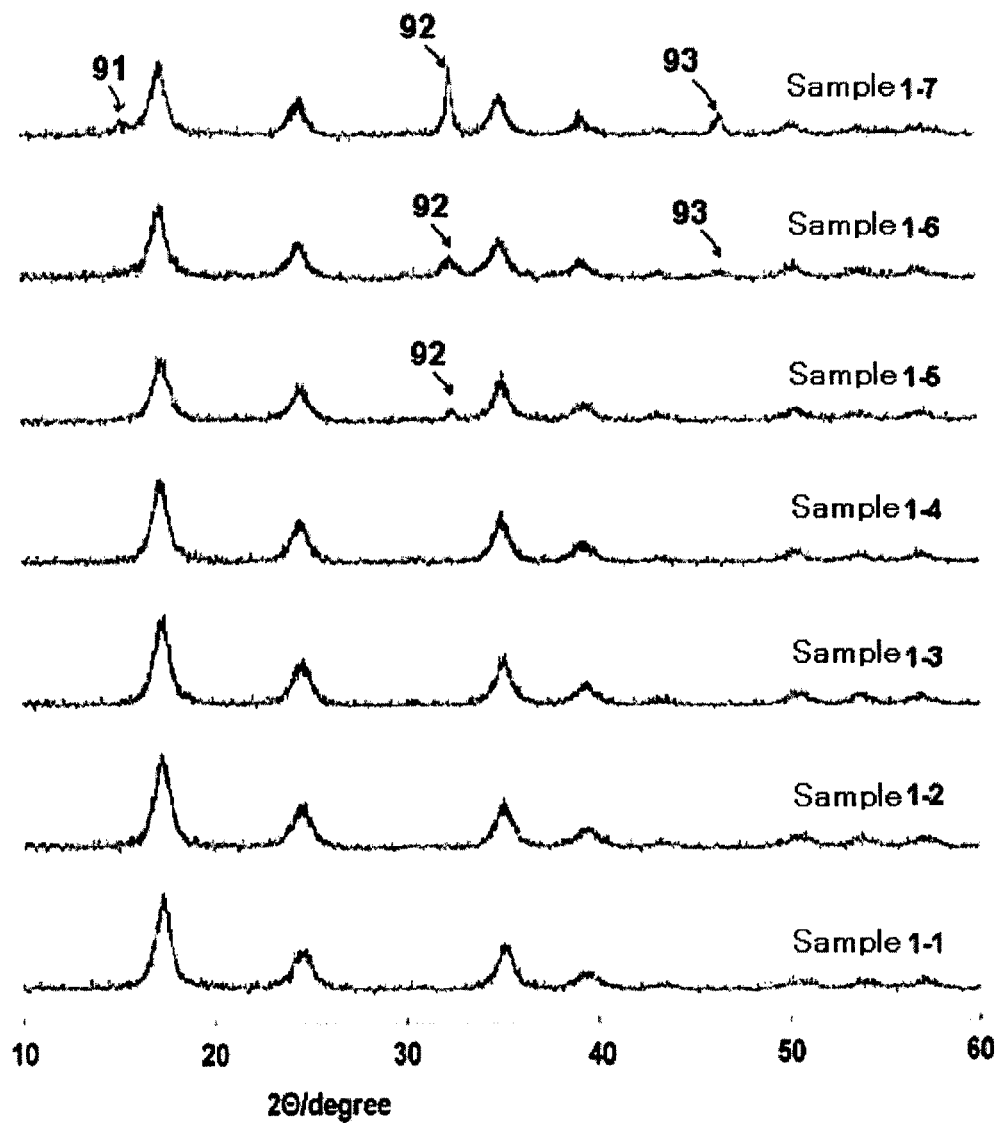
FIG. 9 is an X-ray diffraction chart of the nanoparticles of Prussian blue of the present invention.

(D1) A total of seven kinds of nanoparticles of Prussian blue were each prepared in the same manner as in the above section (B1) except that the addition amount of sodium ferrocyanide added in the section was changed from 60 mg (sample 1-1) to 80 mg (sample 1-2), 120 mg (sample 1-3), 180 mg (sample 1-4), 240 mg (sample 1-5), 360 mg (sample 1-6), or 480 mg (sample 1-7). FIG. 9 shows the results of powder X-ray diffraction measurement for the respective samples. The addition amount of ferrocyanide ions in terms of the number of iron ions added in the sample 1-1 corresponds to 5% of the total number of metals (iron ions) of the Prussian blue nanoparticle aggregate produced in the above section (A1); in addition, the addition amount of ferrocyanide ions in terms of the number of iron ions added in the sample 1-2, 1-3, 1-4, 1-5, 1-6, or 1-7 corresponds to 6.7%, 10%, 15%, 20%, 30%, or 40% of the total number of metals (iron ions) of the aggregate, respectively.

A new signal except that of Prussian blue was detected in each of the samples 1-5, 1-6, and 1-7 each having an addition amount of 20% or more (see peaks indicated by arrows 91 to 93 in FIG. 9). The intensity of such signals is increased particularly when the addition amount is increased from 30% (sample 1-6) to 40% (sample 1-7). Such signals are attributable to an unreacted sodium ferrocyanide crystal.

The foregoing results show that the optimum addition amount of sodium ferrocyanide is about 15% for the complete covering of nanoparticles. Accordingly, it can be estimated that the number of iron ion sites exposed to a crystal surface to which ferrocyanide ions can be bonded (iron ion sites coordinated with water molecules from which cyano groups have been severed) is about 15% of the total number of iron ions. The particle size of each of the Prussian blue nanoparticles (tetragonal crystal model) estimated from the number of iron ions exposed to the surface is about 10 nm; in consideration of the roughness of the crystal surface, the particle size reflects the results of the TEM image (FIG. 8) and the grain size measurement by dynamic light scattering (FIG. 7) well.

In addition, the solid powders of the nanoparticles of Prussian blue (samples 1-1 to 1-7) produced in the above sections were each dispersed in water, methanol, or the like. Of those, a sample in which ferrocyanide ions accounted for 5% or more of the total number of metals (iron ions) of a Prussian blue nanoparticle aggregate showed high dispersion stability for water. In contrast, a Prussian blue nanoparticle solid powder produced by setting the addition amount of ferrocyanide ions to 7 to 15% showed high dispersion stability for methanol. As described above, setting the addition amount of ferrocyanide ions within a proper range enabled the realization of dispersion stability suitable for each solvent. The foregoing results show that a dispersion stable region varies depending on a solvent, and nanoparticles having such dispersion selectivity as to be dispersed only in a specific solvent can also be produced.

Next, the zeta potentials of the nanoparticles of Prussian blue (samples 1-1 to 1-7) each stably dispersed in water or methanol were measured. The measured zeta potentials each showed a negative value (for example, the zeta potential of the methanol dispersion of the nanoparticle solid powder of Prussian blue (sample 1-4) to which 15% of ferrocyanide ions had been added was −23 mV). That is, the following is found: each of the nanoparticles has a ferrocyanide ion bonded to its crystal surface so as to have negative surface charge, whereby the aggregation of the nanoparticles are inhibited by the action of charge repulsion, and the nanoparticles are stably dispersed.

Example 2

Figure 11:
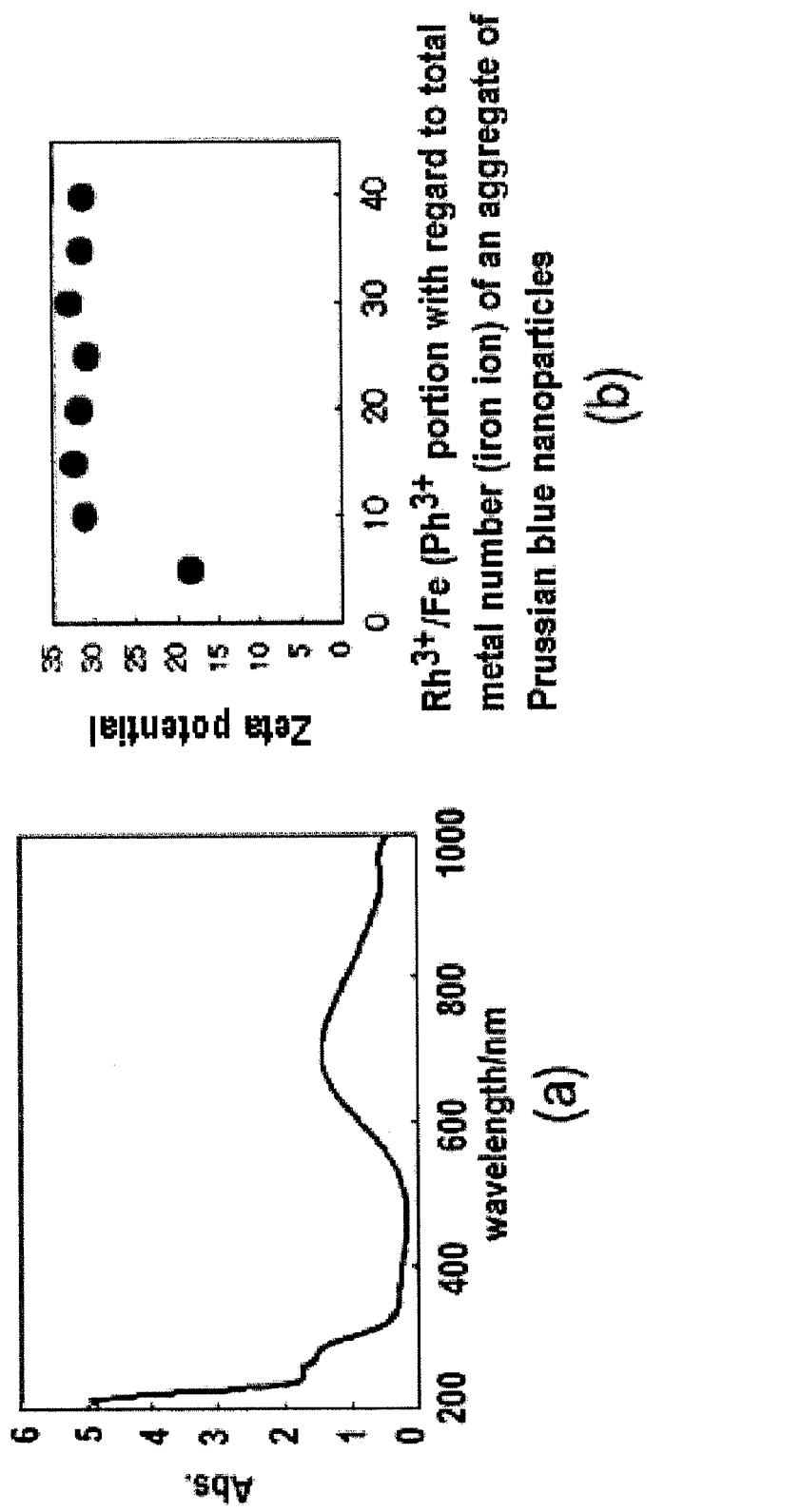
FIG. 11 are graphs showing respective results of measurement for a dispersion of the nanoparticles ($Rh^{3+}$-adsorbing fine particles) of Prussian blue of the present invention, FIG. 11(a) being a graph showing an absorption spectrum of the dispersion and FIG. 11(b) being a graph showing a change in zeta potential of the dispersion with an addition amount of $Rh^{3+}$.
Figure 12:
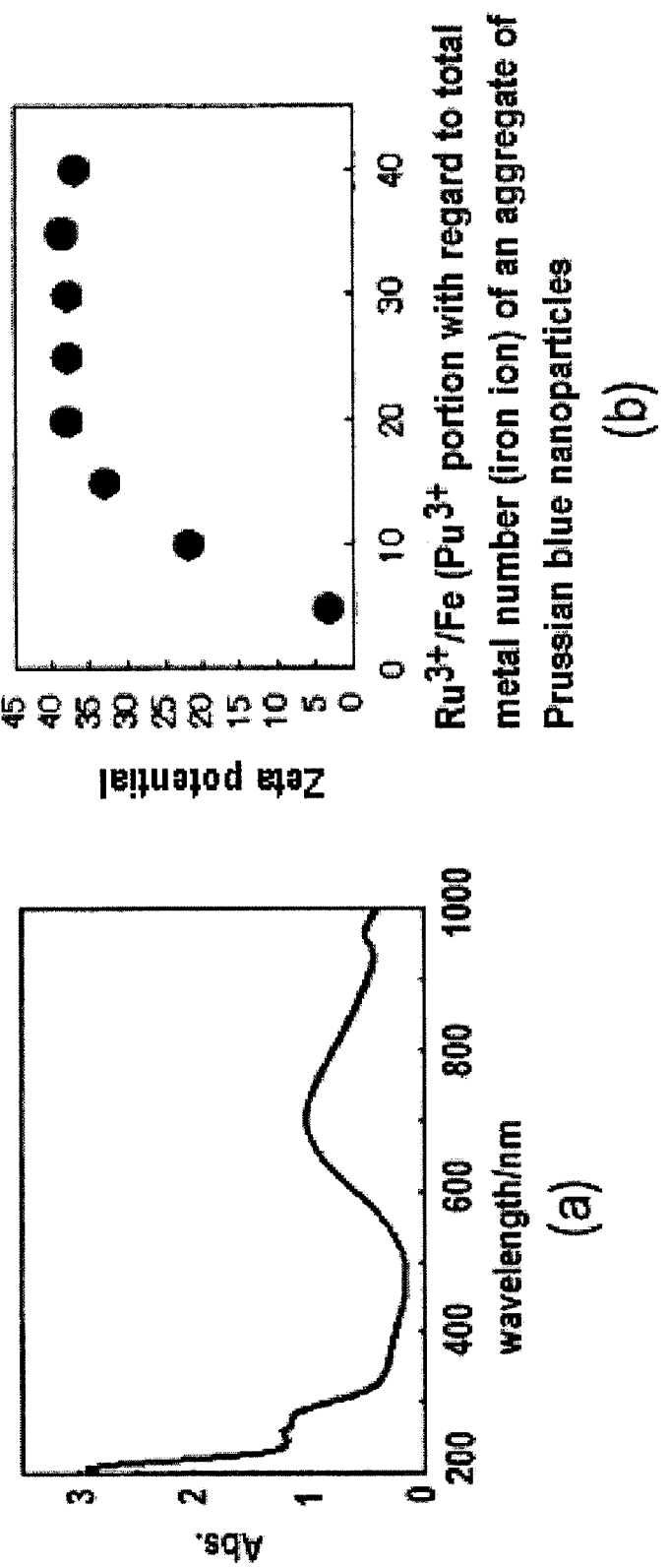
FIG. 12 are graphs showing respective results of measurement for a dispersion of the nanoparticles ($Ru^{3+}$-adsorbing fine particles) of Prussian blue of the present invention, FIG. 12(a) being a graph showing an absorption spectrum of the dispersion and FIG. 12(b) being a graph showing a change in zeta potential of the dispersion with an addition amount of $Ru^{3+}$.

Production of Prussian Blue Nanoparticles Each Utilizing Metal Ion as Coating Agent The Prussian blue complex produced in the above section (A1) (50 mg) was suspended in 1.0 ml of water, and 1.0 ml of an aqueous solution of $Rh(NO)_3$ having a concentration of $1.5 \times 10^{-2}$ M to 0.12 M was added to the suspension. After that, the mixture was stirred for one day. As a result, a blue, transparent aqueous solution (sample 2-1) in which the nanoparticles of Prussian blue of the present invention were stably dispersed was obtained. Separately from the foregoing, a blue, transparent dispersion (sample 2-2) of the nanoparticles of Prussian blue of the present invention was prepared in the same manner as that described above except that an aqueous solution of $RuCl_3$ was added instead of the above aqueous solution of $Rh(NO)_3$. In each of the aqueous solutions, a charge-transfer absorption band from Fe(II) to Fe(III) peculiar to Prussian blue having an absorption maximum at around 700 nm was observed (FIG. 11(a) shows the absorption spectrum of the sample 2-1, and FIG. 12(a) shows the absorption spectrum of the sample 2-2).

In addition, the aqueous solution of $Rh(NO_3)$ or the aqueous solution of $RuCl_3$ was added to each of the $Rh^{3+}$ sample (sample 2-1) and the $Ru^{3+}$ sample (sample 2-2) so that a ratio of the number of $Rh^{3+}$'s or $Ru^{3+}$'s to the total number of metals (iron ions) of the Prussian blue complex (core portion) might be 5, 10, 15, 20, 25, 30, 35, or 40%. Thus, a total of sixteen (two kinds times eight) samples were produced. The zeta potentials of the samples each showed a positive value. Then, in each of the case where $Rh^{3+}$ was added and the case where $Ru^{3+}$ was added, when the above addition amount reached 10 to 20%, the zeta potential showed the maximum value to saturate; even when the addition amount was further increased, the value did not change (FIG. 11(b) is a graph showing a change in zeta potential with the addition amount of $Rh^{3+}$, and FIG. 12(b) is a graph showing a change in zeta potential with the addition amount of $Ru^{3+}$).

The above results show that the number of cyano sites exposed to a crystal surface to which $Rh^{3+}$ or $Ru^{3+}$ ions can be bonded is about 10 to 20% of the total number of iron ions. The particle size of each of the nanoparticles of Prussian blue (tetragonal crystal model) estimated from the number of iron ions exposed to the surface was about 7.5 to 10 nm.

The foregoing results show the following: an $Rh^{3+}$ or $Ru^{3+}$ ion is bonded to a cyano site of the surface of the Prussian blue complex crystal so that the surface may have positive surface charge, whereby the aggregation of the nanoparticles are inhibited by the action of charge repulsion, and the nanoparticles are stably dispersed. In addition, the nanoparticles were favorably dispersed in methanol as well.

The present invention can be utilized not only in the synthesis of Prussian blue but also in the synthesis of a material obtained by substituting another metal atom M for an iron atom in Prussian blue (hereinafter referred to as "M-PBA"). Examples of the M-PBA are given below.

Example 3

Production of Cu-PBA Nanoparticles

Figure 13:
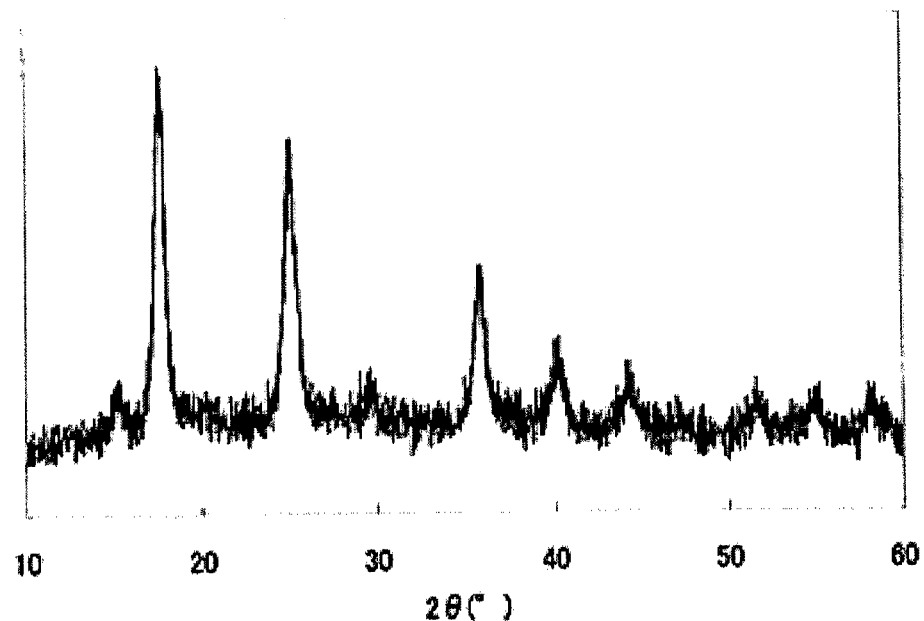
FIG. 13 shows a result of the X-ray structure analysis of Cu-Prussian blue-type metal complex (Cu-PBA) nanoparticles.

An aqueous solution prepared by dissolving 0.4232 g of sodium ferricyanide in 4.0 mL of distilled water was mixed with an aqueous solution prepared by dissolving 0.3993 g of copper acetate monohydrate in 7.0 ml of distilled water, and the mixture was stirred for 3 minutes. The deposited precipitate was centrifuged, washed with water, and dried under reduced pressure, whereby a black powder sample 3-1 was obtained. FIG. 13 shows the result of the X-ray structure analysis of the powder.

The foregoing result shows that the resultant powder sample 3-1 adopts a Prussian blue-type crystal structure, and that a Cu-Prussian blue-type metal complex (Cu-PBA) obtained by substituting copper for an iron atom surrounded by nitrogen atoms of Prussian blue was obtained.

Figure 14:
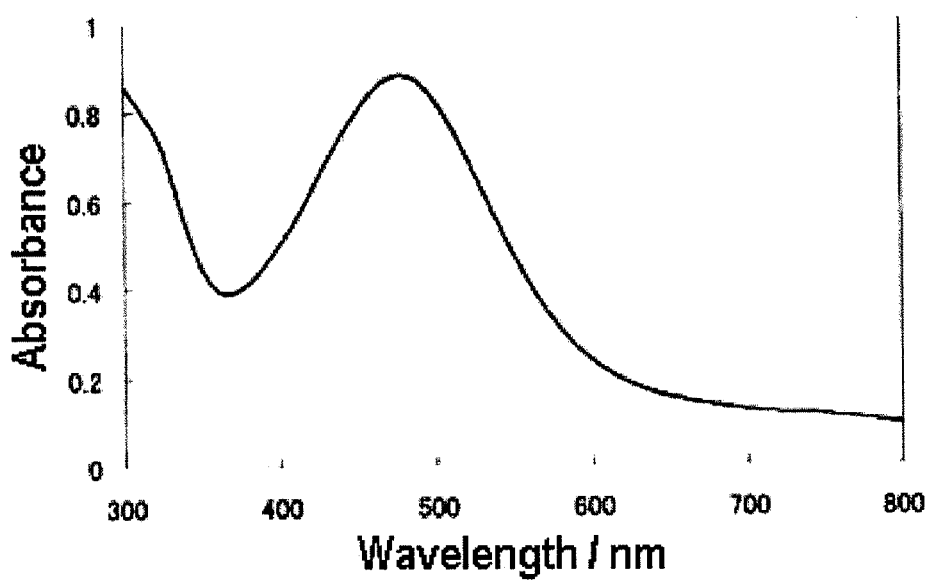
FIG. 14 is an optical absorption spectrum of an aqueous solution of the Cu-Prussian blue-type metal complex (Cu-PBA) nanoparticles.
Figure 15:
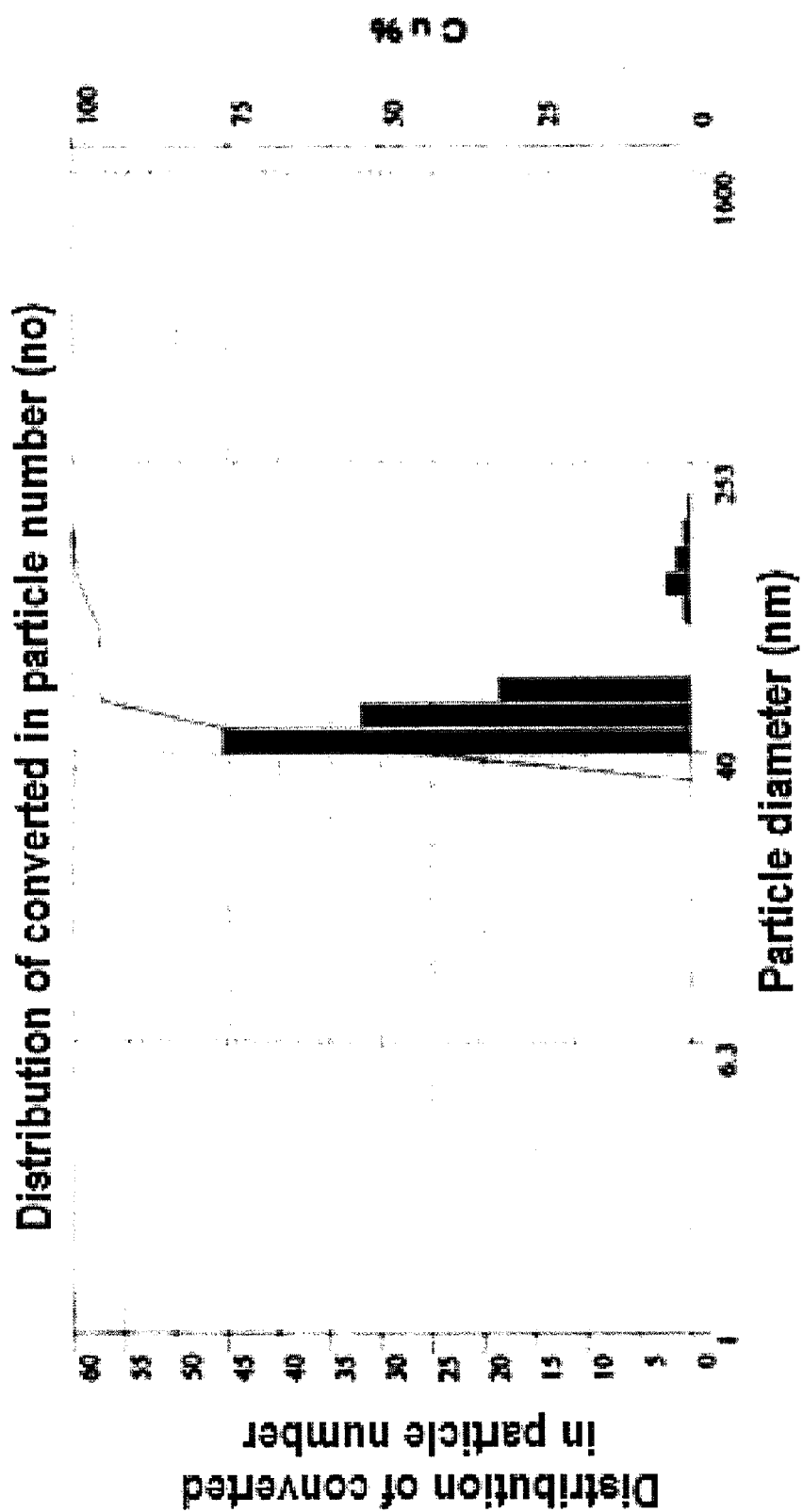
FIG. 15 is a grain size distribution of the Cu-Prussian blue-type metal complex (Cu-PBA) nanoparticles measured by a dynamic light scattering method.

The powder sample 3-1 was dropped to an aqueous solution prepared by dissolving 0.3800 g of iron ferrocyanide in 10.0 ml of distilled water, and the mixture was stirred for one week, whereby a red solution 3-2 was obtained. FIG. 14 shows the optical absorption of the red solution sample 3-2. In addition, FIG. 15 shows the results of the measurement of the particle sizes of the particles in the red solution 3-2 by dynamic light scattering. The foregoing results show that the production of Cu-PBA nanoparticles each having a particle size of about 45 nm was attained.

Example 4

Synthesis of Co-PBA Nanoparticles Using Adjustor

A synthesis example of Co-PBA nanoparticles is given as an example in which the optical responsiveness or particle size of each of nanoparticles can be regulated by adding an adjustor during the synthesis of the nanoparticles.

Figure 16:
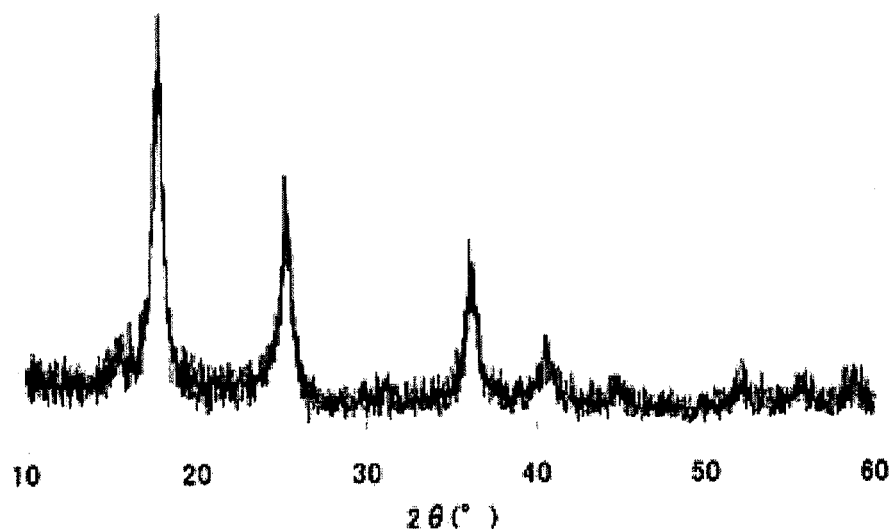
FIG. 16 shows a result of an X-ray structure analysis of ammonia-added Co-Prussian blue-type metal complex (Co-PBA) nanoparticles.

An aqueous solution prepared by dissolving 0.6582 g of sodium ferricyanide in 6.3 mL of distilled water was mixed with 11.9 mL of an aqueous solution prepared by dissolving 0.7476 g of cobalt acetate tetrahydrate in water. Further, 328 µl ($5.0 \times 10^{-3}$ mol) of an aqueous solution of ammonia were added to the mixed liquid, and the whole was stirred for 3 minutes. The deposited precipitate was centrifuged, washed with water and methanol, and dried under reduced pressure, whereby a red powder sample 4-1 was obtained. The powder sample 4-1 was analyzed with an X-ray diffraction apparatus, and the result shown in FIG. 16 was obtained. The foregoing result shows that the powder sample adopts a Prussian blue-type crystal structure.

In addition, the particle size of each nanoparticle in the sample 4-1 was calculated from the Scherrer's relation, and as a result, the particle size was found to be about 17 nm.

Figure 17:
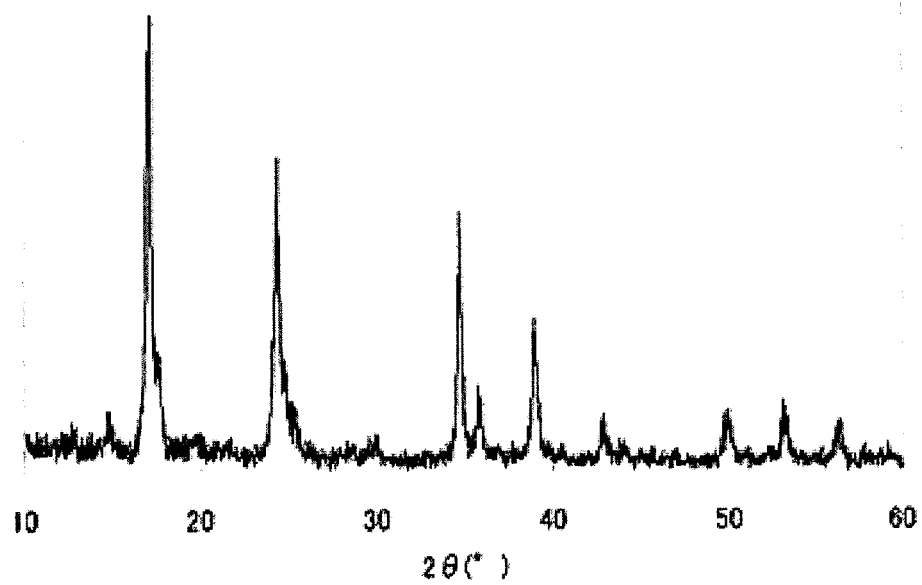
FIG. 17 shows a result of an X-ray structure analysis of ammonia-non-added Co-Prussian blue-type metal complex (Co-PBA) nanoparticles.

In addition, a powder sample 4-2 was obtained by exactly the same production process as that described above except that ammonia was not added. FIG. 17 shows the result of the X-ray diffraction measurement of the powder sample 4-2. The foregoing result shows that the powder sample adopts a Prussian blue-type crystal structure even without the addition of ammonia. However, the particle size thereof was calculated from the Scherrer's relation, and as a result, the particle size was found to be about 30 nm. The foregoing result shows that ammonia added as an adjustor largely changes the particle size of each of the nanoparticles to be synthesized.

2.0 ml of distilled water were added to 0.1 g of the Co-PBA nanoparticles produced by adding ammonia so that the nanoparticles might be suspended. 15 mg of sodium ferrocyanide were added to the suspension, and the mixture was stirred, whereby the suspension changed into a red, transparent liquid. Thus, nanoparticles of $CO_3[Fe(CN)_6]_2$ of the present invention were obtained. Judging from the optical property obtained for a bulk sample in the preceding research, spin states are probably the following high spin states: $S=3/2$ for Co and $S=1/2$ for Fe.

Example 5

Synthesis of Ni-PBA Nanoparticles (A5) A solution prepared by dissolving 25.3 g of sodium ferrocyanide in 80 mL of water was mixed at once with a solution prepared by dissolving 33.6 g of nickel nitrate hexahydrate in 20 mL of water, and the mixture was stirred for 5 minutes. The deposited nickel Prussian blue complex analogue precipitate having a yellowish brown color was obtained by centrifugal separation, washed with water three times and then with methanol once, and dried under reduced pressure. The amount of the resultant in this case was 30.0 g, and the yield in terms of $Ni_3[Fe(CN)_6]_2 \cdot 10H_2O$ was almost 100%.

Figure 18:
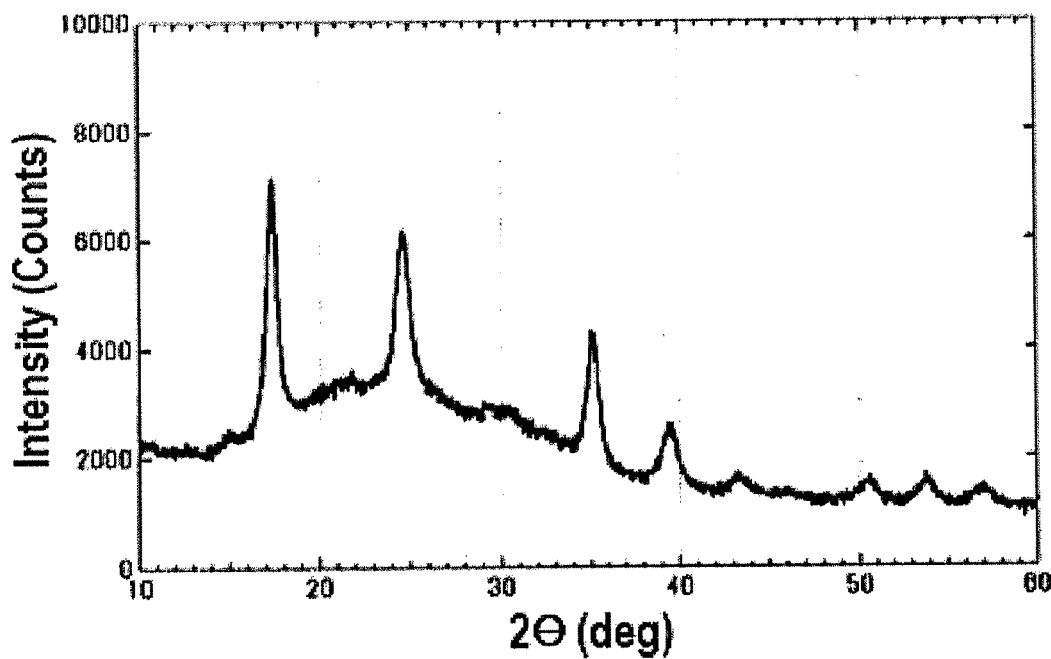
FIG. 18 is an X-ray diffraction chart of nanoparticles of a Ni-Prussian blue complex analogue of the present invention.

FIG. 18 shows the result of the analysis of the produced nickel Prussian blue complex analogue (precipitate) with a powder X-ray diffraction apparatus. The result coincided with that of nickel Prussian blue analogue $Ni_3[Fe(CN)_6]_2$ retrieved from a standard sample database. In addition, the size of each particle of the analogue was estimated from the peak width of the powder X-ray diffraction pattern. As a result, the analogue was found to be an aggregate of nanoparticles each having a particle size of 20 nm.

Figure 19:
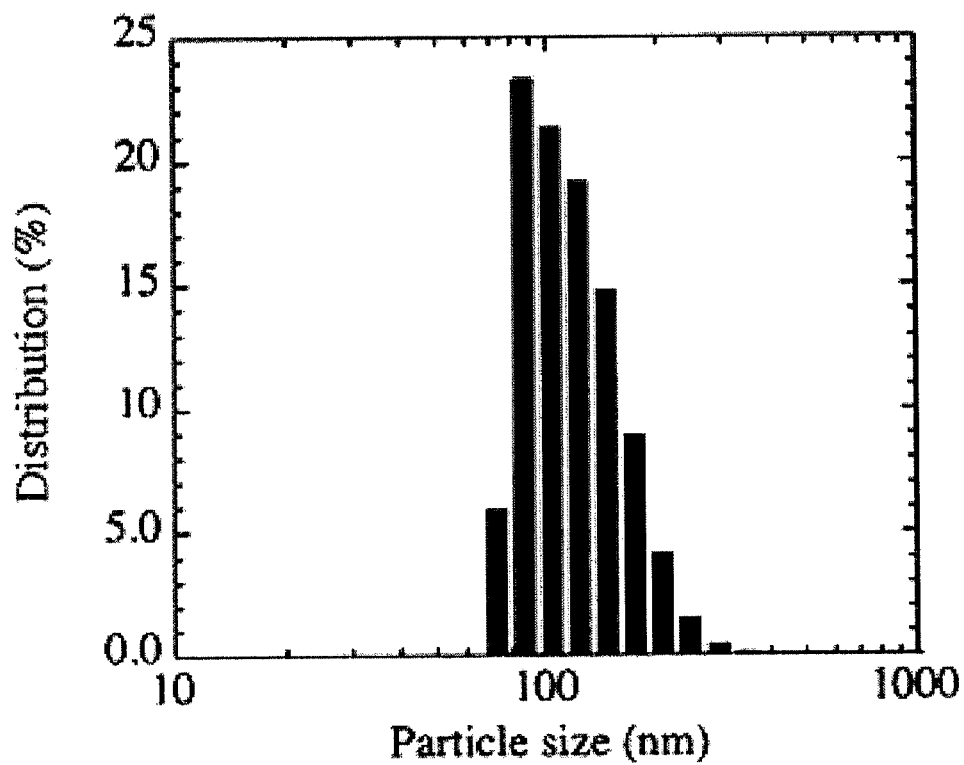
FIG. 19 is a graph showing a particle size distribution of the nanoparticles of the Ni-Prussian blue complex analogue of the present invention.

(B5) 3.1 g of sodium ferrocyanide decahydrate were dissolved in 200 mL of water, and 10.0 g of the nickel Prussian blue complex analogue (aggregate) produced in the above section (A5) were added to the solution. The suspension was stirred all day long, whereby the suspension changed into a yellowish brown solution. Thus, a dispersion of the nanoparticles of the nickel Prussian blue analogue of the present invention was obtained. The particle sizes of the nanoparticles of the nickel Prussian blue complex analogue stably dispersed in the yellowish brown aqueous solution were measured by dynamic light scattering. As shown in FIG. 19, it was found that the nanoparticles of Prussian blue were distributed in water to have a maximum distribution size of about 80 nm.

(C5) Water as a solvent in the water dispersion (yellowish brown solution) prepared in the above section (B5) was removed by distillation under reduced pressure, whereby a powder of nickel Prussian blue complex analogue nanoparticles (sample 5-1) as an aggregated solid was obtained in a substantially quantitative fashion. The resultant powder was re-dispersed in water, whereby a dark yellowish brown, transparent solution was prepared.

In the re-dispersion in a solution, the concentration of a dispersion solution can be as follows: 1.5 g or more of the above sample 5-1 are dispersed in 10 ml of water. A concentrated dispersion is effective in regulating the thickness of a film at the time of film formation from the dispersion because the dispersion often shows thixotropy and has a high viscosity. Meanwhile, the dispersion does not affect the electrochromic property of the film.

Example 6

Synthesis of Fe—Ni Core-Shell-Type Nanoparticles (C6) 1.6 mg of $FeSO_4 \cdot 7H_2O$ were added to the aqueous solution in which the $Ni_3[Fe(CN)_6]_2 \cdot xH_2O$ nanoparticles were dispersed and which were obtained in Example 5, and the mixture was stirred for 2 days. After that, water was removed by distillation under reduced pressure. As a result, a solid powder of nanoparticles (multilayer structure) each having a Prussian blue (shell)/$Ni_3[Fe(CN)_6]_2 \cdot xH_2O$ (core) structure as the Prussian blue-type metal complex nanoparticles of the present invention was obtained (sample 6-1).

(D6) A total of five kinds of Prussian blue-type metal complex nanoparticles each having a core-shell structure were each produced in the same manner as in the above section (C6) except that the amount of $FeSO_4 \cdot 7H_2O$ added in the section was changed from 1.6 mg (sample 6-1) to 3.2 mg (sample 6-1), 4.8 mg (sample 13), 6.4 mg (sample 6-4), or 8.0 mg (sample 6-5). Here, the number of added $Fe^{2+}$ ions in each of the samples 6-1 to 6-5 corresponds to 2 to 10% of the total number of metals of $Ni_3[Fe(CN)_6]_2 \cdot xH_2O$ used. In addition, the color of the resultant solid powder gradually changed from a yellowish green color to a bluish green color with increasing addition amount of $Fe^{2+}$ ions. The foregoing result shows that a Prussian blue structure (blue) was formed on the crystal surface of $Ni_3[Fe(CN)_6]_2 \cdot xH_2O$ (yellow) in dependence on the addition amount of $Fe^{2+}$ ions, and corroborates that nanoparticles each having a Prussian blue (shell)/$Ni_3[Fe(CN)_6]_2 \cdot xH_2O$ (core) structure were produced.

FIGS. 5(b) to 5(f) show the IR spectra of the solid powders as the samples 6-1 to 6-5. It should be noted that FIG. 5(a) shows the result of IR measurement for the Prussian blue complex obtained in Example 1, and FIG. 5(g) shows the result of measurement for the $Ni_3[Fe(CN)_6]_2 \cdot xH_2O$ (x=14 to 15) solid obtained in the above section (A5) of Example 5. As can be seen from the results, in each of the samples 6-1 to 6-5, the stretching vibration absorption of a cyano group of Prussian blue (shell) newly appeared at 2,070 $cm^{-1}$ in addition to the stretching vibration absorption of a cyano group at each of 2,100 $cm^{-1}$ and 2,170 $cm^{-1}$ derived from the $Ni_3[Fe(CN)_6]_2 \cdot xH_2O$ (core) structure, and its relative intensity gradually increased with increasing addition amount of $Fe^{2+}$ ions. In addition, the energy of the absorption maximum of the cyano stretching vibration of the core structure of Prussian blue differed from that of the Prussian blue complex produced in the section (A1) of Example 1 by 10 $cm^{-1}$. The difference shows that the Prussian blue structure as the core and the Prussian blue structure as the shell are surrounded by different environments.

Example 7

Synthesis of Co—Ni Alloy-Type Nanoparticles

As described above, the $M_A$, $M_B$, or the like may be a mixture of two or more kinds of metals. Description will be given as an example by taking the case where Co and Ni are each utilized as the $M_A$.

Figure 20:
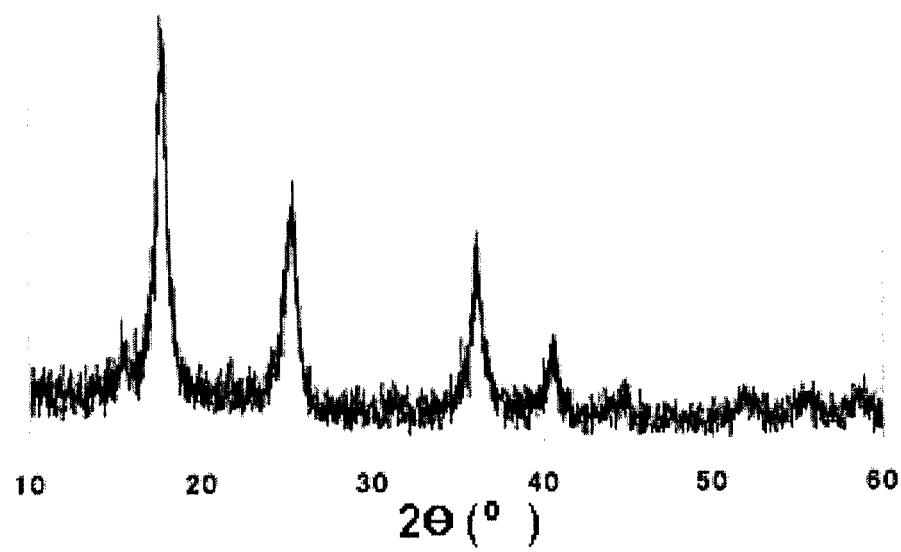
FIG. 20 shows a result of an X-ray structure analysis of nanoparticles in each of which a mixture of Co and Ni is used as $M_A$.

0.1660 g of sodium ferricyanide was dissolved in 1.6 mL of distilled water, and 84.5 µl ($1.25 \times 10^{-3}$ mol) of ammonia were dropped to the solution. The resultant aqueous solution was mixed with an aqueous solution prepared by dissolving 0.1506 g of cobalt acetate tetrahydrate and nickel acetate tetrahydrate in 3.0 ml of distilled water, and the mixture was stirred for 3 minutes. The deposited precipitate was centrifuged, washed with water, and dried under reduced pressure, whereby a purple powder was obtained. FIG. 20 shows the result of the X-ray structure analysis of the powder. The foregoing result shows that the powder adopts a Prussian blue-type crystal structure. In addition, the particle size of each nanoparticle in the powder was estimated from the Scherrer's relation, and as a result, the particle size was found to be about 14.5 nm.

Figure 21:
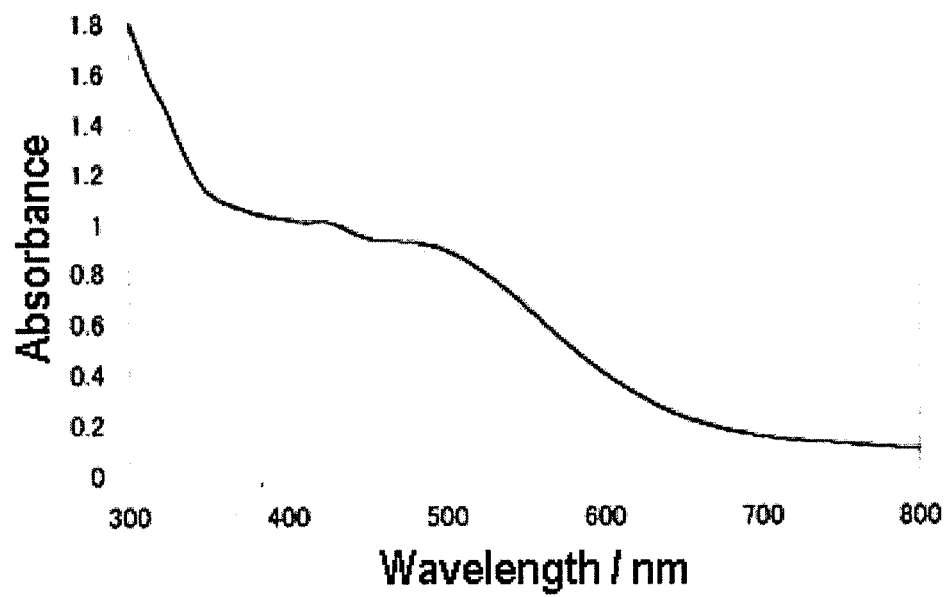
FIG. 21 is an optical absorption spectrum of the nanoparticles in each of which a mixture of Co and Ni is used as $M_A$.

0.1578 g of ammonium ferrocyanide and 5.0 ml of distilled water were added to the powder obtained here, and the mixture was stirred, whereby a red, transparent aqueous solution was obtained. FIG. 21 shows the optical absorption spectrum of the aqueous solution.

Example 8

Synthesis of Fe—Ni-Type Nanoparticles for Organic Solvent

Oleylamine ($6.1 \times 10^{-3}$ g, $2.3 \times 10^{-5}$ mol) was dissolved in 0.5 ml of toluene. Then, 20 mg of each of the samples 6-1 to 6-5 as the nanoparticles each having a core-shell structure obtained in Example 6 (nanoparticles each having a Prussian blue (shell)/$Ni_3[Fe(CN)_6]_2 \cdot xH_2O$ (core) structure) were added to the solution, and the mixture was stirred for 2 days. As a result, yellowish green to bluish green solutions having the following characteristic were obtained: nanoparticles each having a core-shell structure to each of which oleylamine adsorbed (samples 8-1 to 8-5) were dispersed in toluene.

Figure 22:
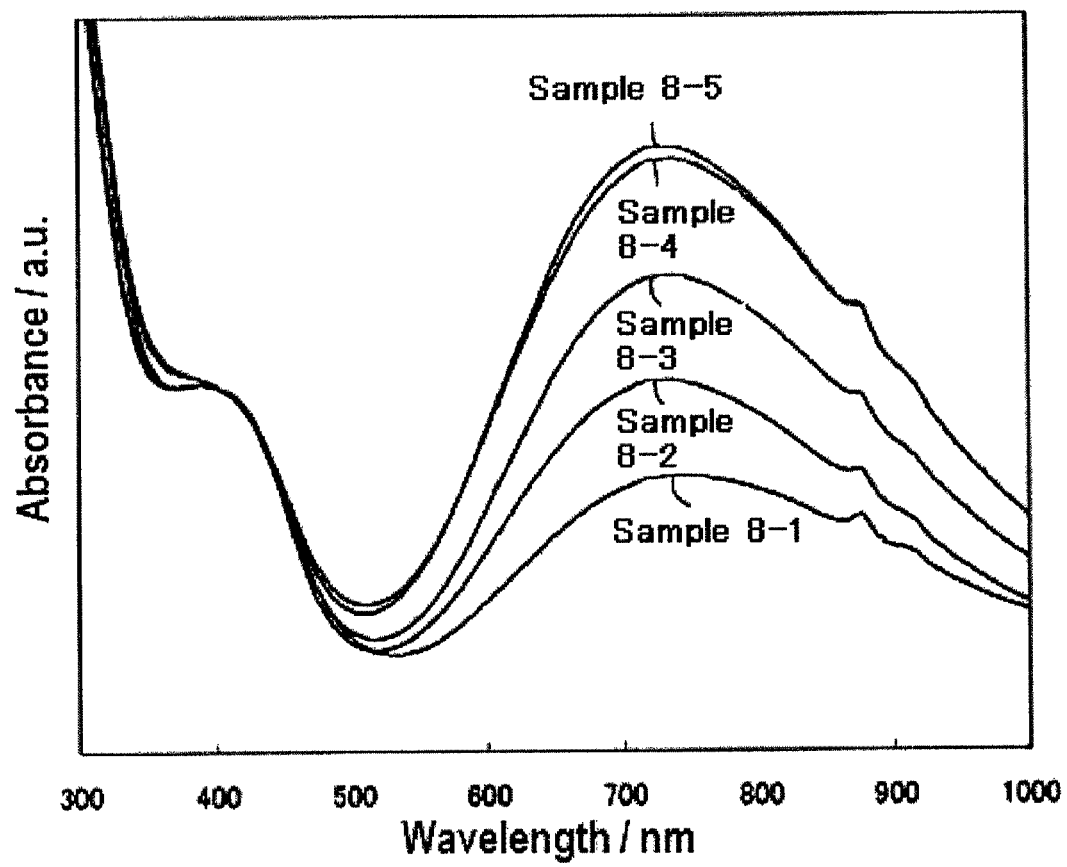
FIG. 22 shows absorption spectra of toluene dispersions of Prussian blue-type metal complex nanoparticles each having a core-shell structure of the present invention.

As shown in FIG. 22, an absorption band at around 700 nm derived from the Prussian blue (shell) structure newly appeared in addition to an absorption band at 400 nm derived from the $Ni_3[Fe(CN)_6]_2 \cdot xH_2O$ (core) structure in the absorption spectrum of the toluene dispersion solution of each of the nanoparticles each having a core-shell structure (samples 8-1 to 8-5). The relative intensity of the newly appearing absorption band gradually increased with increasing addition amount of $Fe^{2+}$ ions.

In this case, the position of an absorption band peak at around 700 nm is independent of the addition amount of $FeSO_4$. This is because the nanoparticles each have a multilayer structure. That is, the nanoparticles are different from those having the following characteristic: the peak position of an absorption band shifts owing to the incorporation of a material. When a needed color is adjusted, it may not be desirable that the peak position of an absorption band should shift; the Prussian blue-type metal complex nanoparticles each having a core-shell structure of the present invention can meet such a request.

Example 9

Film Formation from Prussian Blue Nanoparticles 1

An electrode of the present invention was produced by placing a nanoparticle thin film formed of the Prussian blue-type metal complex nanoparticles (sample 1-1) prepared in Example 1 on an ITO-coated glass substrate by a spin coating method. In this case, 8 ml of a water dispersion $L_A$ (having a concentration of 0.05 g/ml) of the nanoparticles (sample 1) were mixed with 16 ml of methanol so that a dispersion $L_B$ might be prepared. Next, the ITO substrate was placed in a spin coater, and the dispersion $L_B$ was dropped to the substrate. After that, the resultant was subjected to spin coating at a number of revolutions of the spin coater of 1,400 rpm for 10 seconds and then at a number of revolutions of the spin coater of 2,000 rpm for 10 seconds.

Example 10

Film Formation from Prussian Blue Nanoparticles 2

Figure 23:
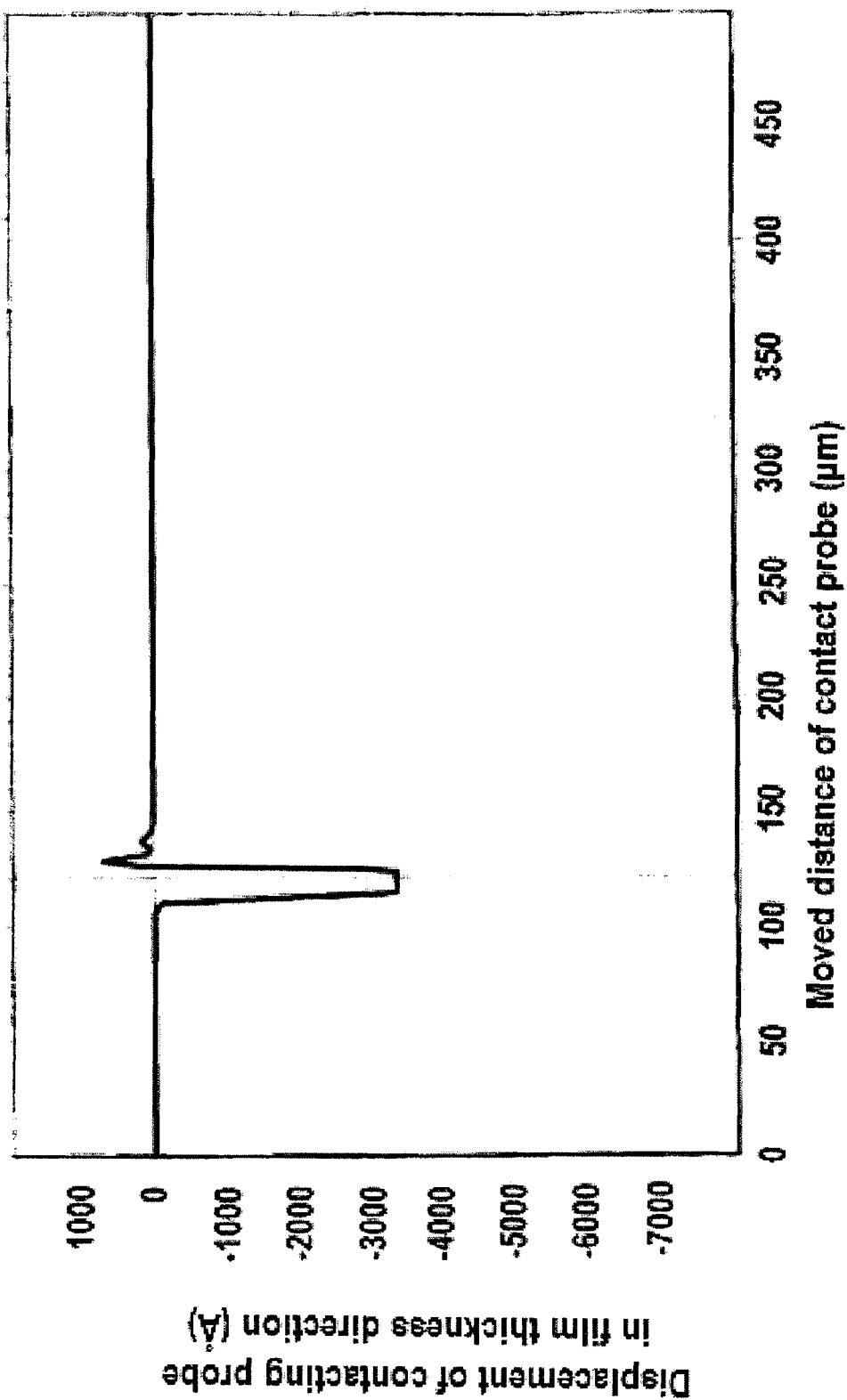
FIG. 23 is a graph showing a result of a measurement of the thickness of a film formed by using a water dispersion containing the nanoparticles of Prussian blue of the present invention with a stylus thickness-measuring apparatus.

Separately from the foregoing, film formation was performed by using the water dispersion $L_A$ using water alone as a solvent as described below. An ITO substrate was placed in a spin coater, and the water dispersion $L_A$ was dropped to the substrate. After that, the resultant was subjected to spin coating at a number of revolutions of the spin coater of 1,400 rpm for 10 seconds and then at a number of revolutions of the spin coater of 2,000 rpm for 10 seconds. As a result, a thin film showing a blue color was obtained (sample 10-1). FIG. 23 shows the result of the measurement of the thickness of the thin film with a stylus thickness-measuring apparatus. Some portions each showing a low value are each a portion from which the nanoparticle thin film has been removed with a metal needle. A difference between the bottom portion of the reverse peak and any other portion (0 nm) indicates the thickness, and the following is found: the thin film has a thickness of about 330 nm, and its surface is smooth. It should be noted that the axis of abscissa in the figure indicates a distance traveled by the stylus at the time of scanning.

Example 11

Film Formation from Prussian Blue Nanoparticles 3: Patterned Thin Film

Figure 24:
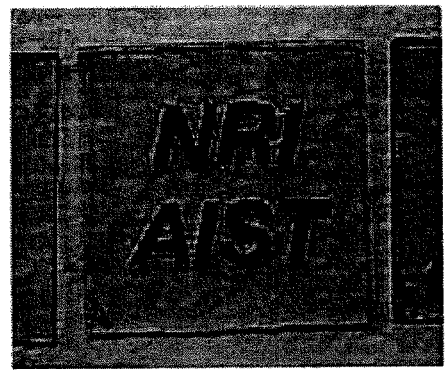
FIG. 24 is a photograph of a pattern printed by using a dispersion of the nanoparticles of the Prussian blue complex of the present invention on the basis of a photolithography technique.

Pattern printing using a photolithography technique as an example of pattern printing based on a wet process was performed on an ITO substrate with an aqueous solution in which the nanoparticles of a Prussian blue metal complex were dispersed. The nanoparticle dispersion used here is prepared by dispersing 0.1 g of the water-dispersible Prussian blue nanoparticles (sample 1-1) in 1 ml of water. A photosensitive resist was applied onto the ITO substrate, and the transfer and development of a pattern were performed with ultraviolet light. After that, a film was formed of the aqueous solution, in which the nanoparticles of the Prussian blue metal complex were dispersed, on the remaining resist pattern by spin coating. The film was sufficiently dried by being left at rest overnight, and the resist film was peeled with acetone, whereby the film of the portion adhering to ITO remained as a pattern. As shown in FIG. 24, the production of the pattern of the Prussian blue metal complex nanoparticles on the ITO substrate was attained. The foregoing approach allows one to produce a pattern as fine as 0.1 mm or less.

Example 12

Film Formation from Ni-PBA Nanoparticles

Film formation by various printing methods is widely and generally applicable to Prussian blue-type complex nanoparticles as well as Prussian blue nanoparticles. The following description will be given by taking film formation from the synthetic nanoparticles of Ni-PBA nano-fine particles as an example.

A nanoparticle thin film was formed of the nanoparticles of the nickel Prussian blue-type complex analogue (sample 5-1) prepared in Example 5 on an ITO-coated glass substrate by a spin coating method. The nanoparticle dispersion used in this case is prepared by dispersing 0.1 g of the sample 5-1 obtained in Example 5 in 1 ml of water. Next, the ITO substrate was placed in a spin coater, and the dispersion was dropped to the substrate. After that, the resultant was subjected to spin coating at 2,000 rpm for 10 seconds. As a result, a uniform film having a thickness of 320 nm was obtained (sample 12-1). The thickness can be regulated within the range of about 80 to 420 nm by changing the number of revolutions at the time of the spin coating to 1,400, 3,000, or 4,000 and by changing the concentration of the ink.

Example 13

Ink-Jet Ejection of Ni-PBA Nanoparticles

A fine pattern can be produced by the ink-jet ejection of a dispersion of the nanoparticles obtained by the present invention.

Figure 25:
FIG. 25 is a photograph showing a manner in which a Ni-PBA nanoparticle dispersion ejected from an ink-jet nozzle flies.
Figure 25:

0.1 g of the sample 5-1 obtained in Example 5 was dispersed in 3.4 ml of water, and the dispersion was ejected from an ink-jet ejection apparatus at a voltage of 6.5 V. FIG. 25 shows a photograph of a droplet flying in air after the ejection. The droplet in the figure had a radius of about 16 µm.

In addition, 100 droplets of the above kind were ejected onto the same position on a glass substrate, and were then dried. As a result, the synthetic nanoparticles of the Ni-PBA nano-fine particles were turned into a circular thin film having a diameter of about 300 µm.

The foregoing shows that microprocessing accurate to 1 mm or less can be performed by ink-jet ejection. In addition, reducing the number of droplets to be dropped onto the same position enables microprocessing as fine as 50 µm or less. In addition, the shape, thickness, and the like of the thin film can be regulated by regulating the hydrophilicity of the substrate.

Example 14

Electrochromic Property of Prussian Blue Nanoparticle Thin Film

Figure 26:
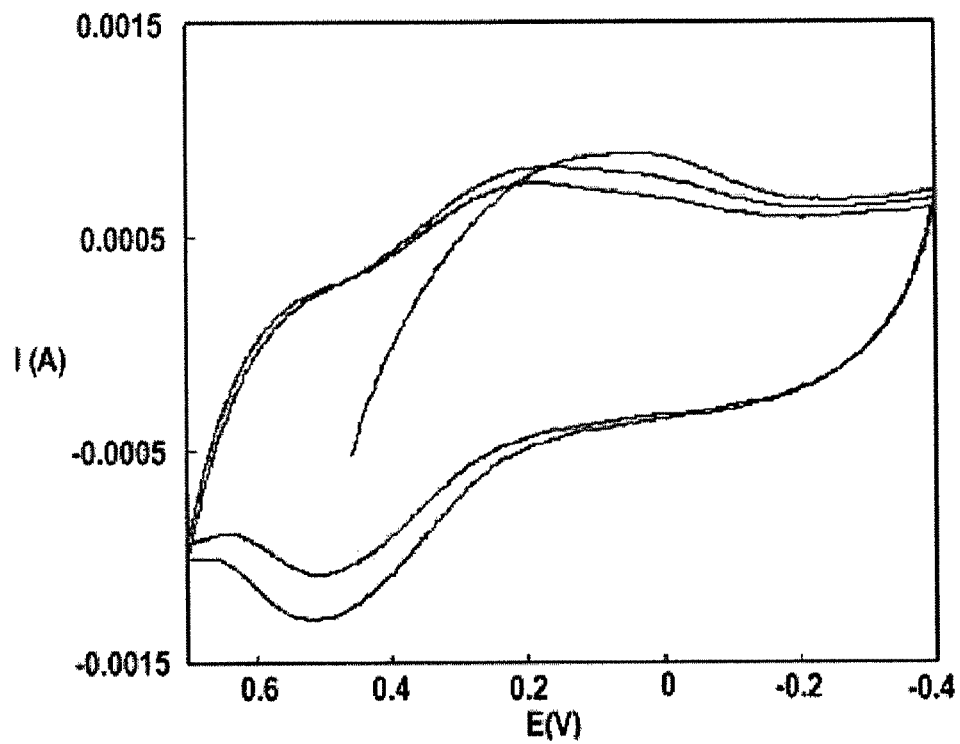
FIG. 26 is a graph showing a result of a cyclic voltammetry measurement of an electrode including the nanoparticles of Prussian blue of the present invention.
Figure 27:
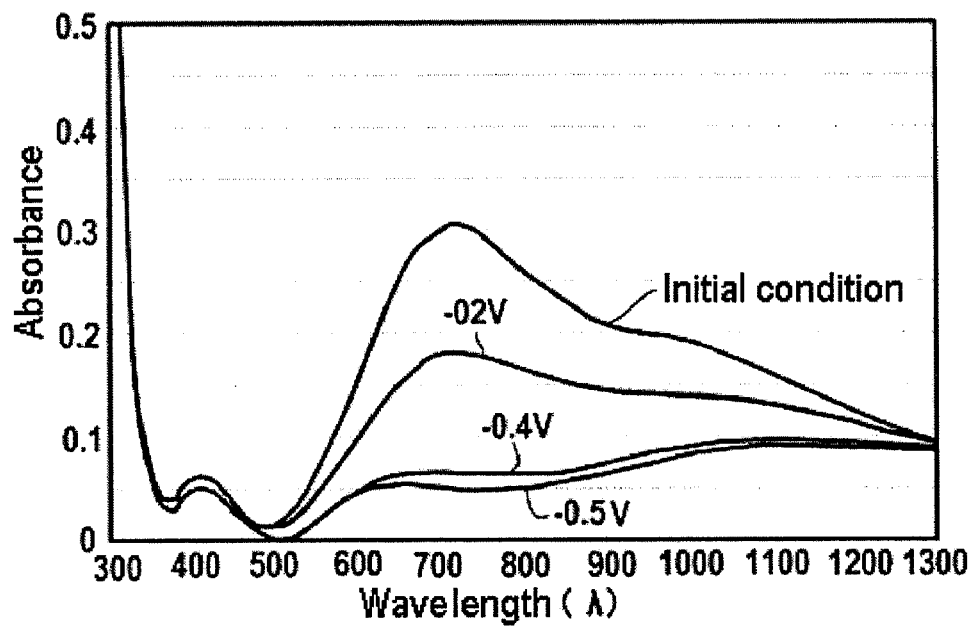
FIG. 27 is a graph showing results (changes in optical spectrum) of UV-vis measurement on a reduction side upon cyclic voltammetry measurement of the electrode including the nanoparticles of Prussian blue of the present invention.
Figure 28:
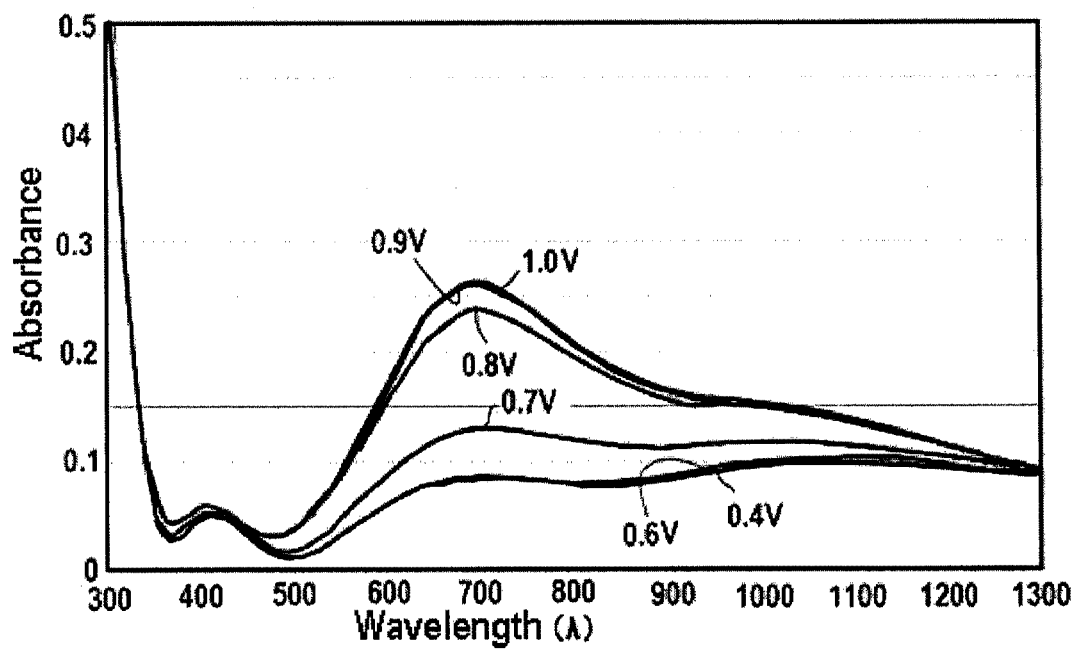
FIG. 28 is a graph showing results (changes in optical spectrum) of UV-vis measurement on an oxidation side upon cyclic voltammetry measurement of the electrode including the nanoparticles of Prussian blue of the present invention.

Cyclic voltammetry measurement was performed by using the electrode produced in Example 9 as a working electrode, platinum as a counter electrode, a saturated caromel electrode (SCE) as a reference electrode, acetonitrile as a solvent, and $KPF_6$ as a supporting electrolyte. FIG. 26 shows the result. The nanoparticle thin film of Prussian blue was brought into a reduced state at a voltage of −0.4 V so as to be transparent. In addition, the thin film was oxidized at a voltage of 0.6 V, whereby its color returned to a blue color. FIG. 27 (reduction side) and FIG. 28 (oxidation side) show the optical spectra of the respective states. In addition, similar results were obtained even when propylene carbonate was used as a solvent.

The foregoing results show that the Prussian blue-type metal complex nanoparticles of the present invention each show good electrochemical responsiveness.

Example 15

Electrochromic Property of Ni-PBA Nanoparticle Thin Film

Figure 29:
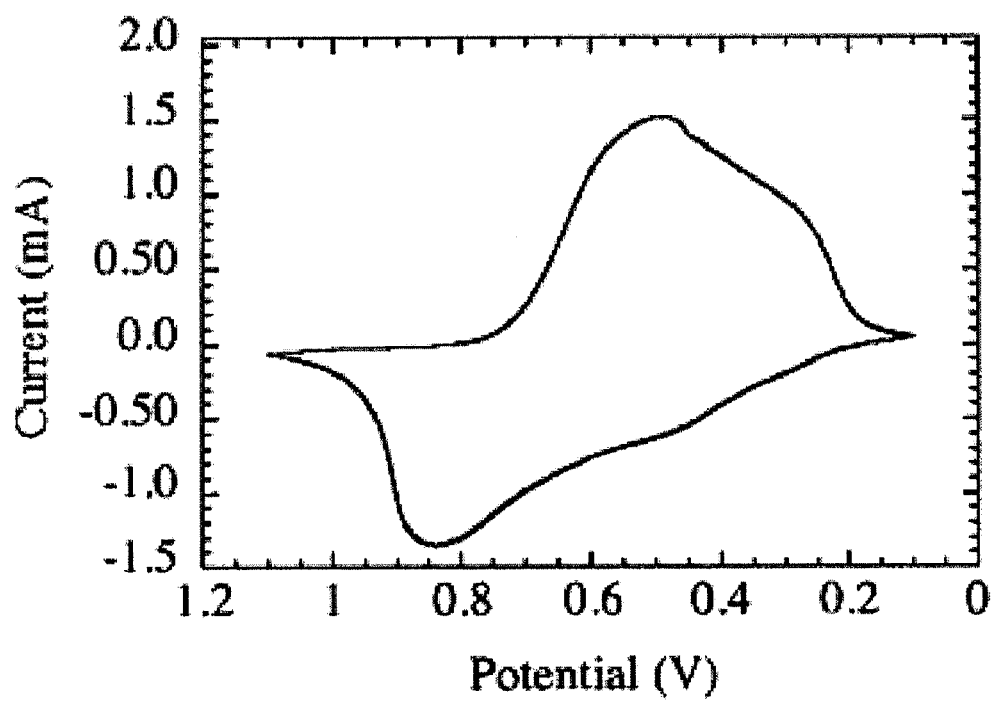
FIG. 29 is a graph showing a result of a cyclic voltammetry measurement of an electrode including the nanoparticles of nickel Prussian blue complex analogous of the present invention.
Figure 30:
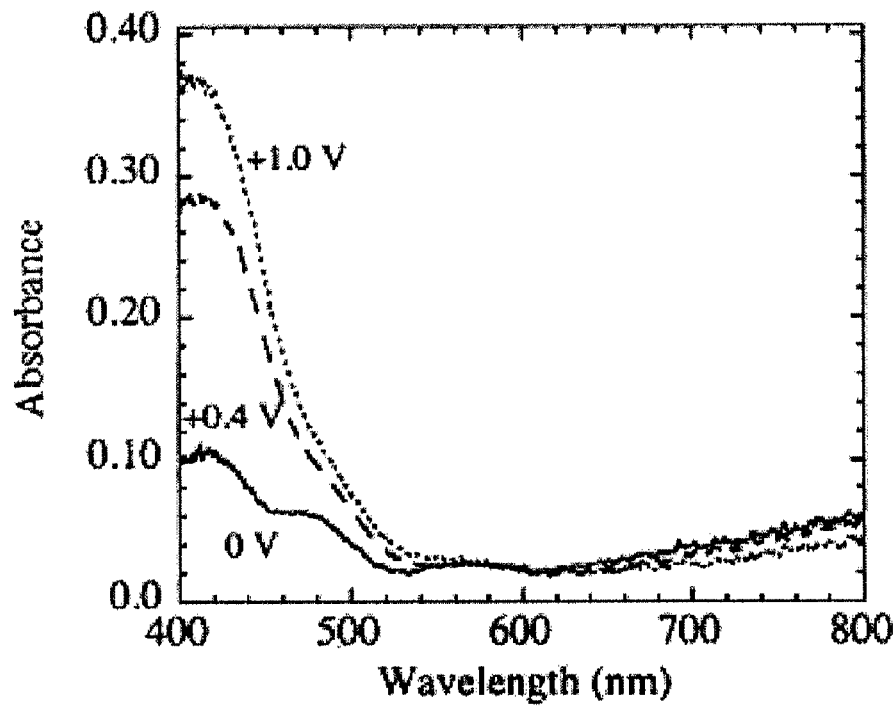
FIG. 30 is a graph showing results (changes in optical spectrum) of UV-vis measurement on an oxidation state of the electrode including the nanoparticles of nickel Prussian blue complex analogous of the present invention in the cyclic voltammetry measurement.

Cyclic voltammetry measurement was performed by using the sample 12-1 produced in Example 12 as a working electrode, platinum as a counter electrode, an SCE as a reference electrode, acetonitrile as a solvent, and $KPF_6$ as a supporting electrolyte. FIG. 29 shows the result. The nanoparticle thin film of nickel Prussian blue complex analogue was brought into a reduced state at a voltage of +0.2 V so as to be transparent. In addition, the thin film was oxidized at a voltage of +1.0 V, whereby its color returned to a yellow color. FIG. 30 shows the optical spectra of the respective states. It was found that absorption at 450 nm or less corresponding to a yellow color was largely changed by the oxidation or reduction.

The foregoing results show that the nickel Prussian blue complex analogue nanoparticles of the present invention each show good electrochemical responsiveness.

Example 16

Chemical Change in Color of Cu-PBA

A change in color of each of the nanoparticles obtained in the present invention can be caused not only by an electrochemical approach but also by any other approach. Description is given by taking a change in color of Cu-PBA obtained in Example 3 by a chemical approach as an example.

The Cu-PBA nanoparticle aqueous solution sample 3-2 obtained in Example 3 was applied onto a glass substrate, and the resultant was left at rest in a hydrazine solution. As a result, a change in color of each nanoparticle from a red color to a white color was observed. The foregoing shows that each nanoparticle is reduced by hydrazine so as to change its color.

Example 17

Figure 31:
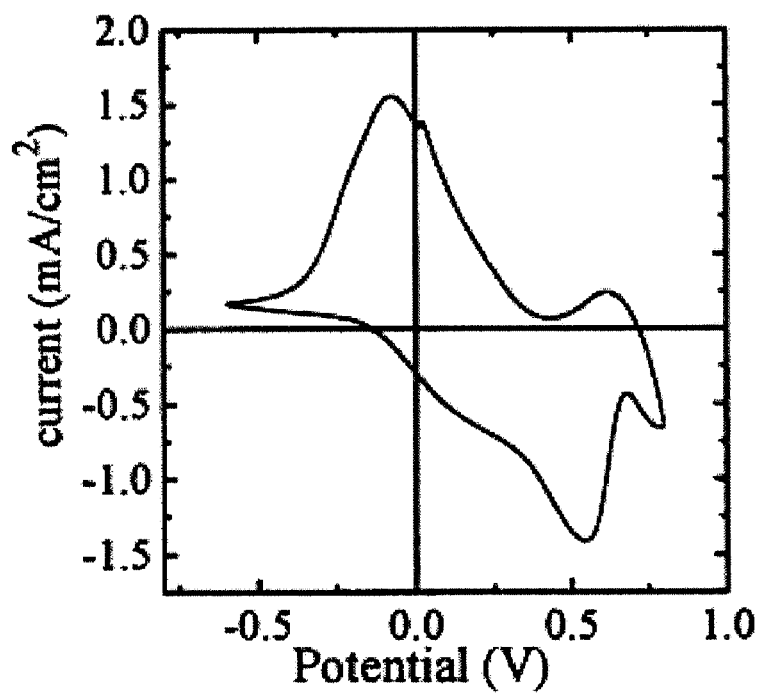
FIG. 31 is a view showing a cyclic voltammogram of the Prussian blue nanoparticles applied to a PET substrate.

Formation of Prussian Blue Nanoparticle Thin Film on Flexible Thin Film and Electrochromic Property of the Thin Film High-accuracy film formation can be performed even on a flexible substrate such as polyethylene terephthalate (PET) by utilizing the nanoparticle dispersion obtained in the present invention. The upper portion of an ITO-coated PET substrate was subjected to spin coating by utilizing a dispersion prepared by dispersing 0.1 g of the Prussian blue nanoparticles as the sample 1-1 in 1 ml. The cyclic voltammetry measurement of the resultant nanoparticle thin film was performed by using acetonitrile as a solvent and $KPF_6$ as an indicating electrolyte. FIG. 31 shows the result. As shown in the figure, the thin film shows good electrochemical property even when the thin film is formed on the ITO-coated PET substrate. In addition, the thickness of the thin film measured with a stylus step difference meter was about 200 nm.

Figure 32:
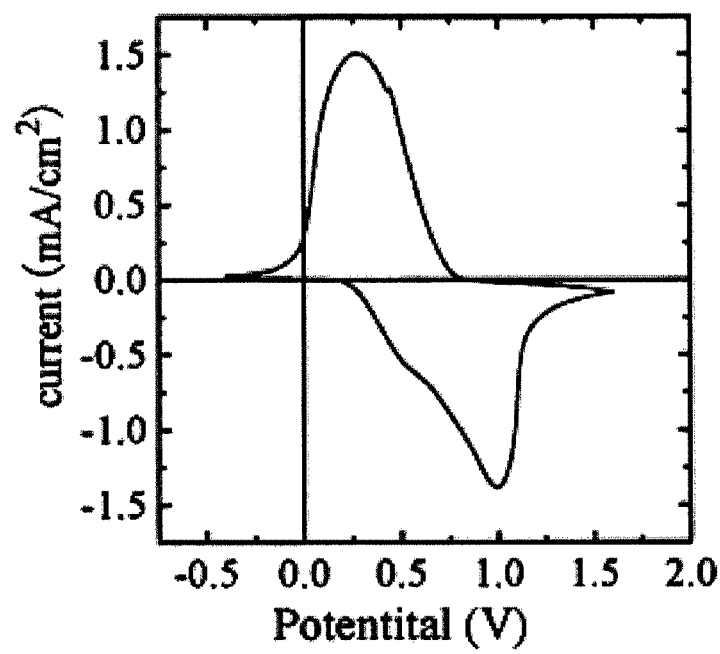
FIG. 32 is a view showing a cyclic voltammogram of Ni-PBA nanoparticles applied to the PET substrate.

In addition, any other analogue as well as Prussian blue can be caused to express electrochromic property by being applied onto a flexible substrate. The upper portion of an ITO-coated PET substrate was subjected to spin coating by utilizing a dispersion prepared by dispersing 0.1 g of the Ni-PBA nanoparticles (sample 5-1) in 1 ml. The cyclic voltammetry measurement of the resultant nanoparticle thin film was performed by using acetonitrile as a solvent and $KPF_6$ as an indicating electrolyte. FIG. 32 shows the result. As shown in the figure, the thin film shows good electrochemical property even when the thin film is formed on the ITO-coated PET substrate.

Example 18

Transmitted Light-Regulator Using Prussian Blue and Ni-PBA

The transmitted light-regulator shown in FIG. 2 can be produced by utilizing a metal substrate on which the Prussian blue-type metal complex nanoparticle thin film described so far has been provided. An example of the apparatus will be described below.

The product obtained in Example 10 by providing the Prussian blue nanoparticle thin film on the ITO substrate was used as 10A in FIG. 2. The product shown in Example 12 obtained by providing the Ni-PBA nanoparticle thin film sample 12-1 on the ITO substrate was used as 10B in FIG. 2. A 0.1 M solution of $KPF_6$ in acetonitrile was injected as the electrolyte liquid 14 between the two products opposed to each other, and the resultant was sealed with a thermosetting film having a thickness of 50 μm, whereby the transmitted light-regulator shown in FIG. 2 was produced.

Figure 33:
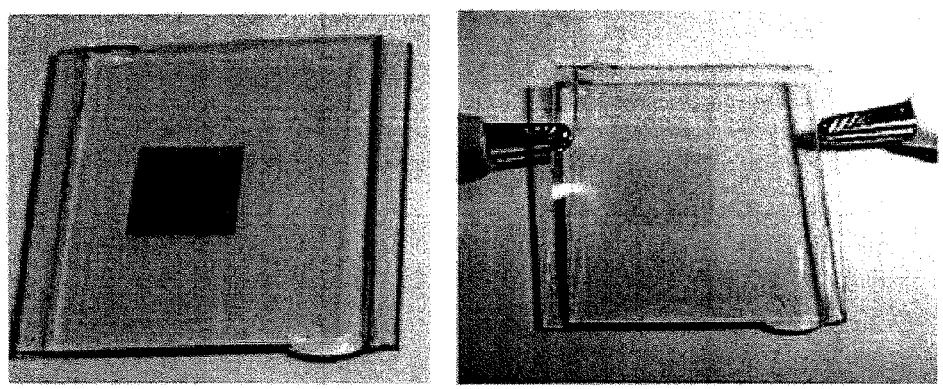
FIG. 33 is a photograph showing a change in color of the transmitted light-regulator after the application of a voltage as compared to the color before the application.

Positive and reverse voltages were periodically applied between the electrodes 12 and 16. As can be seen from FIG. 33, the Prussian blue nanoparticle thin film changes between a blue color state and a transparent state before and after the application of the voltages.

Figure 34:
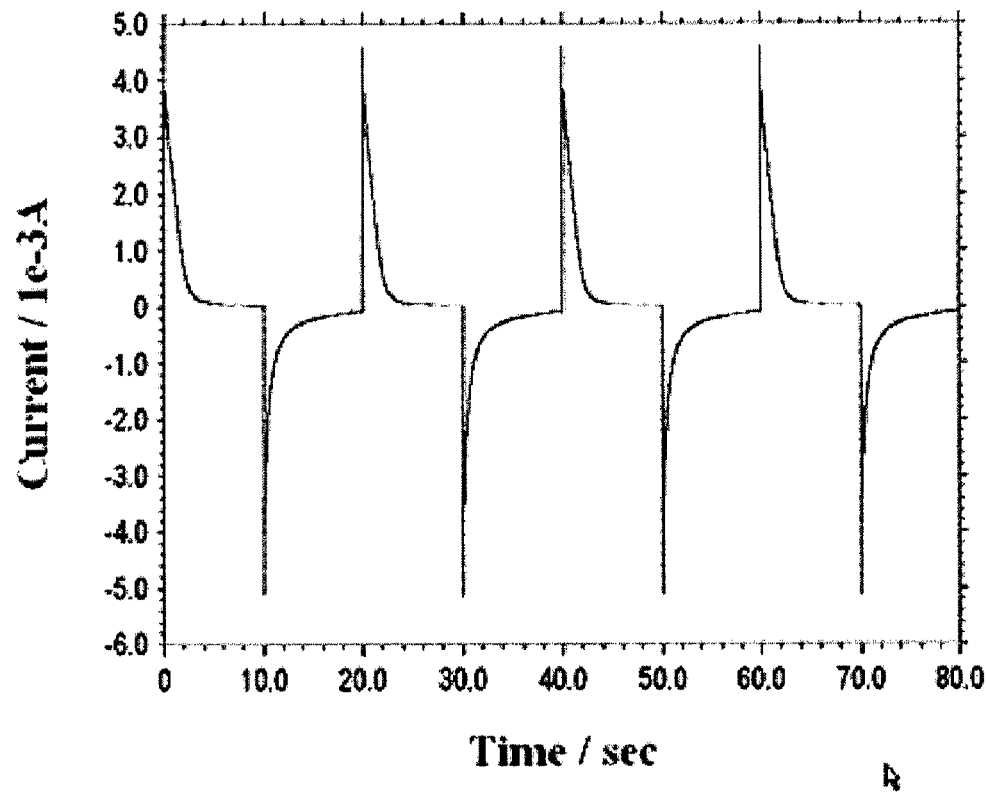
FIG. 34 is a graph showing a voltage change when positive and reverse voltages are periodically applied to the transmitted light-regulator.
Figure 35:
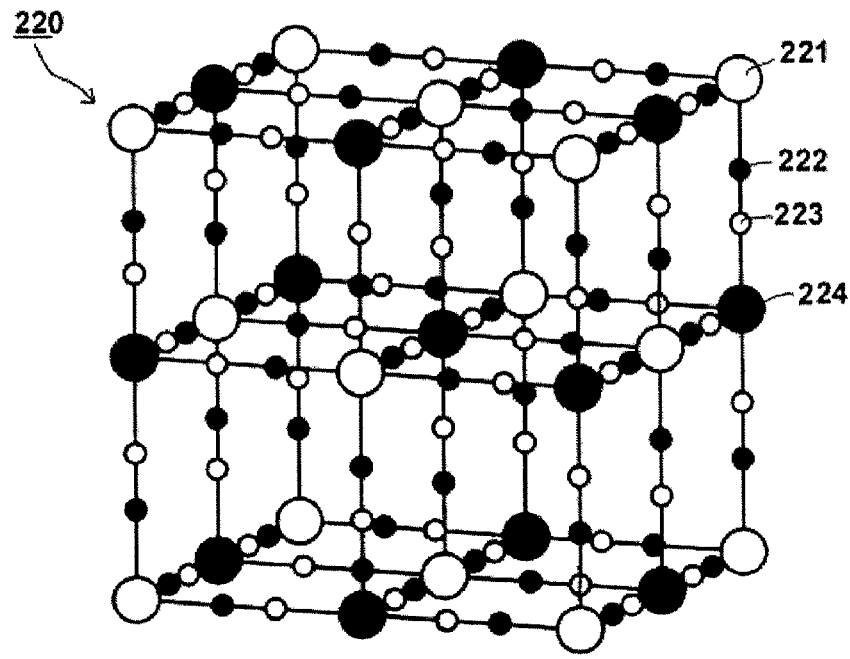
FIG. 35 is an explanatory view schematically illustrating the crystalline structure of Prussian blue-type metal complex.

In addition, FIG. 34 shows a current change in this case. As can be seen from the figure, a current flows periodically by the application of the positive and reverse voltages.

The invention claimed is:

1. Prussian blue metal complex nanoparticles, comprising: a crystal of a Prussian blue metal complex comprising a metal atom $M_A$ and a metal atom $M_b$ crosslinked via a cyano group (CN), and a metal cyano complex anion and/or a metal cation adsorbed on the surface of the crystal,
wherein the complex crystal is substantially insoluble in water, and a surface of each fine particle is negatively or positively charged by the adsorption of the anion and/or the cation so as to make the fine particle soluble or dispersible in water, and
wherein the adsorbed metal cyano complex anion ($C^-$) comprises a metal atom $M_C$ as a central metal, and the adsorbed metal cation is a cation ($D^+$) of metal atom $M_D$, wherein:
$M_A$ is at least one metal atom selected from the group consisting of vanadium, chromium, molybdenum, tungsten, manganese, iron, ruthenium, cobalt, nickel, platinum, and copper;
$M_B$ is at least one metal atom selected from the group consisting of vanadium, chromium, manganese, iron, ruthenium, cobalt, rhodium, nickel, palladium, platinum, copper, silver, zinc, lanthanum, europium, gadolinium, lutetium, barium, strontium and calcium;
$M_C$ is at least one metal atom selected from the group consisting of vanadium, chromium, molybdenum, tungsten, manganese, iron, ruthenium, cobalt, nickel, platinum, and copper; $M_D$ is at least one metal atom selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium the crystal of a Prussian blue-type metal complex has the metal atom $M_A$ and the metal atom $M_B$ precipitated by mixing an aqueous solution containing a metal cyano complex anion ($A^-$) having the metal atom $M_A$ as a central metal and an aqueous solution containing a cation ($B^+$) of the metal atom $M_B$, and the nanoparticle has a structure with a crystal portion made of $A^-$ and $B^+$ and a surrounding portion made of $C^-$ and/or $D^+$.

2. The Prussian blue metal complex nanoparticles according to claim 1, wherein the complex crystal forms a core portion, and the anion and the cation adsorbed on the core portion form a shell portion in combination thereof, so that the shell portion formed in having metal composition different from that of the core portion a Prussian blue metal complex structure.

3. The Prussian blue metal complex nanoparticles according to claim 2, wherein the nanoparticles are each provided with multiple shell portions of being identical to or different from each other in metal composition.

4. The Prussian blue metal complex nanoparticles according to claim 1, further comprising: ligands adsorbed on the outer surfaces of the nanoparticles.

5. The Prussian blue metal complex nanoparticles according to claim 4, wherein the ligand has 4 or more and 100 or less carbon atoms.

6. The Prussian blue metal complex nanoparticles according to claim 4, wherein the protecting ligand is represented by any one of formulae 1 to 3:

[Formula 1]

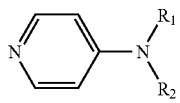

Formula (1)

wherein $R_1$ and $R_2$ each independently represent a hydrogen atom, or, an alkyl group, alkenyl group, or alkynyl group, of having 8 or more carbon atoms;

[Formula 2]

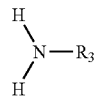

Formula (2)

wherein $R_3$ represents an alkyl group, alkenyl group, or alkynyl group, of having 8 or more carbon atoms;

[Formula 3]

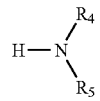

Formula (3)

wherein $R_4$ represents an alkyl group, alkenyl group, or alkynyl group, of having 6 or more carbon atoms; and $R_5$ represents an alkyl group, an alkenyl group, or an alkynyl group.

7. The Prussian blue metal complex nanoparticles according to claim 6, wherein the substituents $R_1$ to $R_4$ each represent an alkenyl group.

8. A method of regulating the color of Prussian blue-type metal complex nanoparticles, comprising: providing the nanoparticles each having a core-shell structure according to claim 2; and, adjusting the amount of the shell portion.

9. Prussian blue metal complex nanoparticles, wherein the color of the nanoparticles is regulated by the method according to claim 8.

10. The Prussian blue metal complex nanoparticles according to claim 1, wherein the nano-particles have an average diameter of 500 nm or less.

11. A dispersion comprising water and the Prussian blue metal complex nanoparticles according to claim 1.

12. The Prussian blue metal complex nanoparticles according to claim 1, wherein the Prussian blue metal complex substantially has a structure such that two kinds of metal atoms assembling NaCl-type lattices are three-dimensionally crosslinked with cyano groups.

13. The Prussian blue metal complex nanoparticles according to claim 1, wherein a molar ratio of the total number of moles of the metal atoms $M_A$ and $M_B$ and the number of moles of the metal atom $M_C$ or $M_D$ is within a range of 1:0.01 to 1:0.5.

* * * * *